(12) United States Patent
Mun et al.

(10) Patent No.: US 11,224,103 B2
(45) Date of Patent: Jan. 11, 2022

(54) LED LIGHTING APPARATUS

(71) Applicant: Silicon Works Co., Ltd., Daejeon (KR)

(72) Inventors: Gyeong Sik Mun, Daejeon (KR); Ki Soo Kwon, Daejeon (KR); Sang Young Lee, Daejeon (KR); Ki Chul An, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 0 days.

(21) Appl. No.: 17/049,666

(22) PCT Filed: Apr. 23, 2018

(86) PCT No.: PCT/KR2018/004678
§ 371 (c)(1),
(2) Date: Oct. 22, 2020

(87) PCT Pub. No.: WO2019/208839
PCT Pub. Date: Oct. 31, 2019

(65) Prior Publication Data
US 2021/0243863 A1 Aug. 5, 2021

(51) Int. Cl.
| | | |
|---|---|---|
| H05B 45/30 | (2020.01) | |
| H05B 33/08 | (2020.01) | |
| H05B 45/35 | (2020.01) | |
| H05B 47/17 | (2020.01) | |
| H05B 45/36 | (2020.01) | |
| H05B 45/39 | (2020.01) | |

(52) U.S. Cl.
CPC ............ *H05B 33/08* (2013.01); *H05B 45/35* (2020.01); *H05B 45/36* (2020.01); *H05B 45/39* (2020.01); *H05B 47/17* (2020.01)

(58) Field of Classification Search
CPC ........ H05B 45/20; H05B 45/35; H05B 45/38; H05B 45/44; H05B 45/48; H05B 45/54; H05B 45/375; H05B 45/397
See application file for complete search history.

(56) References Cited

U.S. PATENT DOCUMENTS

| | | | | |
|---|---|---|---|---|
| 2010/0194298 A1* | 8/2010 | Kuwabara | ............... | H05B 45/48 315/186 |
| 2012/0206047 A1* | 8/2012 | Vos | ........................ | H05B 45/10 315/122 |

(Continued)

FOREIGN PATENT DOCUMENTS

| | | |
|---|---|---|
| KR | 10-1110380 B1 | 2/2012 |
| KR | 10-1582450 B1 | 1/2016 |

(Continued)

*Primary Examiner* — Tung X Le
(74) *Attorney, Agent, or Firm* — Polsinelli PC

(57) ABSTRACT

An LED lighting apparatus includes a first LED light source and a second LED light source included in a first light source group; a third LED light source and a fourth LED light source included in a second light source group; a mode detection circuit configured to determine a mode; a current control unit for serial and parallel connection of the first light source group and the second light source group; balancing circuits for serial and parallel connection of the respective light source groups; and a current path providing circuit for providing current paths. The LED lighting apparatus performs light emission in various states depending on the change of a rectified voltage and the change of a mode.

20 Claims, 21 Drawing Sheets

(56) References Cited

U.S. PATENT DOCUMENTS

| | | | | |
|---|---|---|---|---|
| 2014/0145628 A1* | 5/2014 | Wang | ...................... | H05B 45/54 |
| | | | | 315/187 |
| 2015/0137701 A1* | 5/2015 | Siessegger | ............ | H01L 27/156 |
| | | | | 315/294 |
| 2016/0174314 A1* | 6/2016 | Moon | ................... | H05B 45/44 |
| | | | | 315/201 |
| 2017/0290111 A1* | 10/2017 | Akiyama | ............... | H05B 45/20 |
| 2020/0037409 A1* | 1/2020 | Peeters | ................ | H01L 33/502 |

FOREIGN PATENT DOCUMENTS

| KR | 10-2016-0096524 A | 8/2016 |
|---|---|---|
| KR | 10-2016-0116527 A | 10/2016 |
| KR | 10-1825213 B1 | 3/2018 |

* cited by examiner

LED LIGHTING APPARATUS

RELATED APPLICATIONS

This application is a national stage filing under 35 U.S.C. 371 of international application number PCT/KR2019/004678, filed Apr. 23, 2018, the content of which is incorporated by reference herein in its entirety.

TECHNICAL FIELD

The disclosure relates to a light emitting diode (LED) lighting apparatus, and more particularly, to an LED lighting apparatus capable of being driven in a dual mode in correspondence to rectified voltages having different rated voltages.

BACKGROUND ART

A lighting apparatus is being developed to use a light source which exhibits high light emission efficiency using a small amount of energy, in order to reduce energy consumption. A representative light source used in the lighting apparatus may include an LED.

The LED provides advantages in that it is distinguished from other light sources in terms of various factors such as energy consumption, lifetime and quality of light. The LED has a characteristic in that it is driven by current.

In order to satisfy such a current driving characteristic, a lighting apparatus has been developed to provide AC power to the LED in an AC direct type. Hereinafter, a lighting apparatus using an LED as a light source as described above will be referred to as an LED lighting apparatus.

The LED lighting apparatus is configured such that AC power is converted into a rectified voltage and the LED emits light by current driving using the rectified voltage. The rectified voltage means a voltage which is generated as an AC voltage of commercial AC power is full-wave rectified by a rectifier.

The LED lighting apparatus may be exposed to various voltage environments. Therefore, the LED lighting apparatus is required to be designed to have compatibility in correspondence to rectified voltages with different rated voltages. For example, the LED lighting apparatus may be used in a voltage environment which provides a rated voltage of 120V and a rated voltage of 277V, and in this case, needs to be designed to support a dual mode.

In the case of emitting light using a rectified voltage having a lower peak level between dual voltages by the rated voltages, the LED lighting apparatus is required to perform current regulation and uniform dimming.

In the case of emitting light using a rectified voltage having a higher peak level between the dual voltages, the LED lighting apparatus is required to perform power regulation.

In the case where a dimmer is configured for dimming, the LED lighting apparatus is required to selectively provide a bleeding function, in consideration of the operation characteristic of the dimmer, depending on a mode.

Further, the LED lighting apparatus needs to reduce a total harmonic distortion (THD) phenomenon.

Hence, the LED lighting apparatus needs to be designed to have a specification to meet the above needs and requirements in combination.

DISCLOSURE

Technical Problem

Various embodiments are directed to an LED lighting apparatus which can emit light in a dual mode in correspondence to rectified voltages by different rated voltages and can perform current regulation or voltage regulation depending on a mode, thereby implementing uniform dimming, current regulation and power regulation and reducing a THD phenomenon.

Also, various embodiments are directed to an LED lighting apparatus which can selectively provide a bleeding function depending on a mode.

Technical Solution

In an embodiment, an LED lighting apparatus may include: a first LED light source and a second LED light source included in a first light source group; a third LED light source and a fourth LED light source included in a second light source group; a mode determination unit configured to determine a first mode and a second mode depending on a peak level of a rectified voltage and provide a mode control signal and a current control signal corresponding to a mode, the rectified voltage of the second mode having the peak level higher than the first mode; a current control unit configured to transfer, by the current control signal, the rectified voltage to the second light source group by bypassing the first light source group, during an entire period of the first mode and a first period of the second mode in which the rectified voltage is lower than a preset control level; a first balancing circuit configured to be set in a first balancing level to a different level depending on a mode by the current control signal, and transfer the rectified voltage to the second LED light source by bypassing the first LED light source in the case where the rectified voltage is lower than the first balancing level; a second balancing circuit configured to be set in a second balancing level to a different level depending on a mode by the current control signal, and transfer the rectified voltage to the fourth LED light source by bypassing the third LED light source in the case where the rectified voltage is lower than the second balancing level; and a current path providing circuit configured to, in correspondence to the mode control signal, provide, in the first mode, to the first LED light source to the fourth LED light source, a first current path changed in correspondence to light emission of each of the first light source group and the second light source group in which arrangement states of LED light sources therein are changed to series or parallel in correspondence to change of the rectified voltage through one cycle according to turn-on and turn-off of the first balancing circuit and second balancing circuit, and provide, in the second mode, to the fourth LED light source, a second current path corresponding to light emission of the first LED light source to the fourth LED light source whose serial connection state is changed in correspondence to change of the rectified voltage through one cycle according to sequential turn-off and turn-on of the current control unit, the second balancing circuit and the first balancing circuit.

In an embodiment, an LED lighting apparatus may include: a first LED light source and a second LED light source included in a first light source group; a third LED light source and a fourth LED light source included in a second light source group; a mode detection circuit configured to provide, in correspondence to that a rectified voltage of a first mode has a peak level higher than a second mode, a mode detection signal which has a different level in each mode, by using a peak voltage which follows the peak level of the rectified voltage; a current control unit configured to transfer, by a current control signal, the rectified voltage to the second light source group by bypassing the first light source group, during an entire period of the first mode and a first period of the second mode in which the rectified voltage is lower than a preset control level; a first balancing circuit configured to be set in a first balancing level to a different level depending on a mode by the current control signal, and transfer the rectified voltage to the second LED light source by bypassing the first LED light source in the case where the rectified voltage is lower than the first balancing level; a second balancing circuit configured to be set in a second balancing level to a different level depending on a mode by the current control signal, and transfer the rectified voltage to the fourth LED light source by bypassing the third LED light source in the case where the rectified voltage is lower than the rectified voltage the second balancing level; a first driver configured to provide a first current path corresponding to serial or parallel connection of the first LED light source and the second LED light source in the first mode; and a second driver configured to provide a second current path corresponding to serial or parallel connection of the third LED light source and the fourth LED light source in the first mode, and provide a third current path to the fourth LED light source in the second mode, wherein at least one of the first driver and the second driver provides the current control signal which has a different level in each mode, in correspondence to the mode detection signal.

Advantageous Effects

According to the embodiments of the disclosure, the LED lighting apparatus may emit light in a dual mode in correspondence to rectified voltages with different peak levels. Therefore, the LED lighting apparatus provides an advantage in that it can support various voltage environments.

Also, according to the embodiments of the disclosure, the LED lighting apparatus may operate in the dual mode in correspondence to rectified voltages by different rated voltages, may perform current regulation and uniform dimming in the case of emitting light by a rectified voltage with a low peak level, and may perform power regulation in the case of emitting light by a rectified voltage with a high peak level. Therefore, the LED lighting apparatus according to the embodiments of the disclosure provides an advantage in that it can maintain uniform power consumption.

Further, according to the embodiments of the disclosure, the LED lighting apparatus may provide a bleeding function, and by the bleeding function, may be capable of a stable operation in consideration of the operation characteristic of a dimmer.

Moreover, according to the embodiments of the disclosure, the LED lighting apparatus may control the change of driving current by light emission to follow the waveform of a rectified voltage, thereby reducing a total harmonic distortion (THD) phenomenon.

MODE FOR DISCLOSURE

Figure 1:
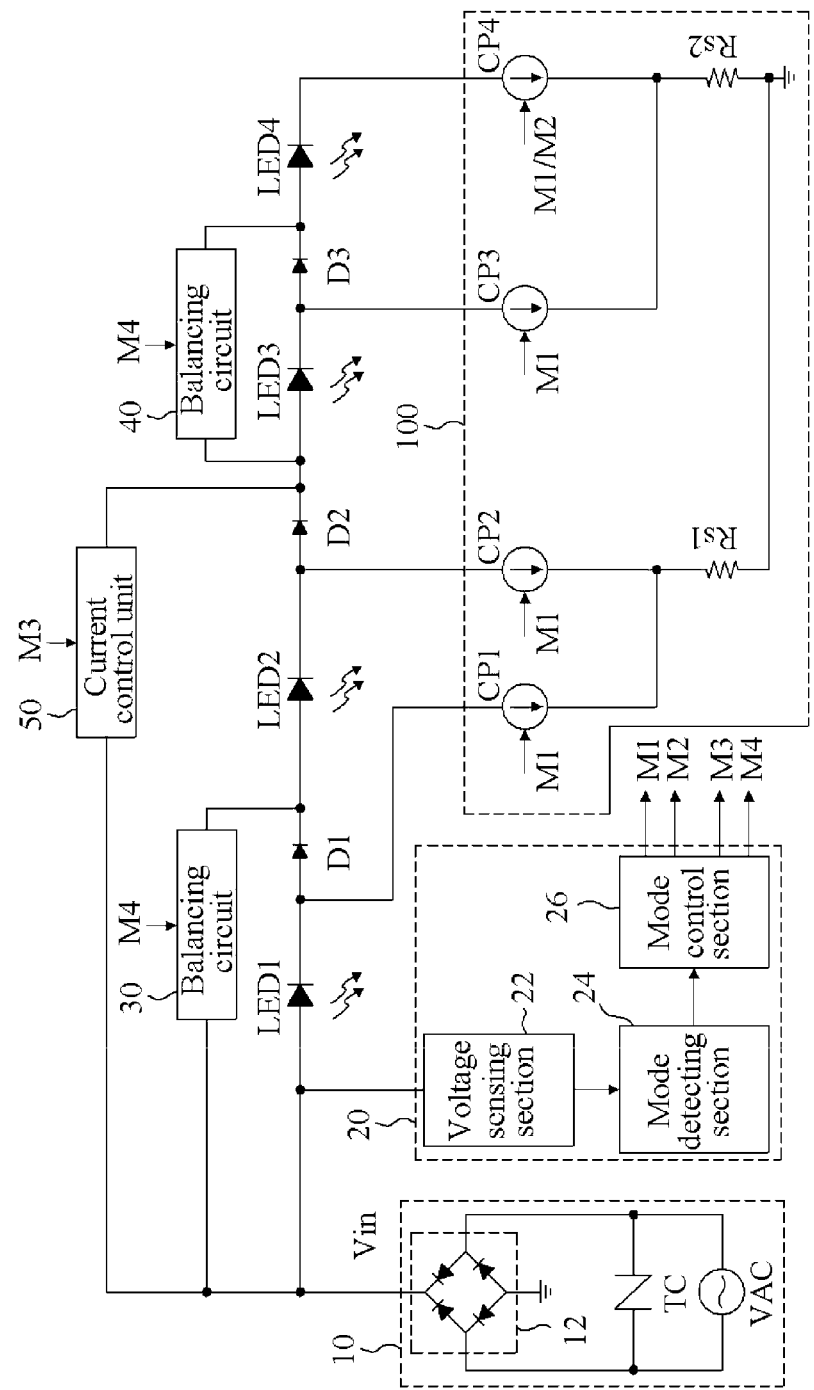
FIG. 1 is a block diagram illustrating an LED lighting apparatus in accordance with an embodiment of the disclosure.

Hereinafter, embodiments of the disclosure will be described in detail with reference to the accompanying drawings. The terms used herein and in the claims shall not be construed as being limited to general or dictionary meanings and shall be interpreted as the meanings and concepts corresponding to technical aspects of the disclosure.

Embodiments described herein and configurations illustrated in the drawings are preferred embodiments of the disclosure, but do not represent all of the technical features of the disclosure. Thus, there may be various equivalents and modifications that can be made thereto at the time of filing the present application.

An LED lighting apparatus in accordance with an embodiment of the disclosure using LEDs as light sources is configured to perform a dual mode of emitting light by rectified voltages with different rated voltages. The LED lighting apparatus in accordance with the embodiment of the disclosure is configured to perform regulation in different ways depending on a mode.

The dual mode in accordance with the embodiment of the disclosure may be divided into a first mode and a second mode. For example, the first mode may be defined as a mode of emitting light by a rectified voltage with a rated voltage of 120V, and the second mode may be defined as a mode of emitting light by a rectified voltage with a rated voltage of 277V higher than the rated voltage of the first mode.

The embodiment of the disclosure may emit light in correspondence to the rectified voltages with the rated voltage of 120V and the rated voltage of 277V, and performs current regulation corresponding to light emission in the first mode and performs power regulation corresponding to light emission in the second mode.

A configuration of the embodiment of the disclosure will be described below with reference to FIG. 1.

The embodiment of the disclosure includes a power circuit 10 which provides a rectified voltage Vin which is full-wave rectified using commercial AC power with a rated voltage of 120V or a rated voltage of 277V.

The power circuit 10 includes a commercial power supply VAC, a dimmer TC and a rectifier circuit 12.

The commercial power supply VAC supplies commercial AC power of a power system. For example, the commercial AC power may be exemplified as having an AC voltage with a rated voltage of 120V or an AC voltage with a rated voltage of 277V.

The dimmer TC may control the phase of an AC voltage which is provided to the rectifier circuit 12 from the commercial power supply VAC. The dimmer TC controls the amount of a driving current supplied for light emission, by controlling the phase of the AC voltage. As a result, the dimmer TC may control a degree to which the LED lighting apparatus emits light, that is, a brightness.

The rectifier circuit 12 full-wave rectifies the AC voltage, and outputs the rectified voltage Vin which is generated as a result of the full-wave rectification. For example, the rectifier circuit 12 may be configured using a bridge diode which includes four diodes. In the case where the phase of the AC voltage is controlled by the dimmer TC, the rectifier circuit 12 outputs the rectified voltage Vin which is obtained by full-wave rectifying the phase-controlled AC voltage.

By the power circuit 10, the rectified voltage Vin has a peak level corresponding to the rated voltage of 120V or the rated voltage of 277V, is phase-controlled by the dimmer TC, and has a waveform which is full-wave rectified by the rectifier circuit 12.

The rectified voltage Vin has a cycle corresponding to ½ of the cycle of the AC voltage provided from the commercial power supply VAC. That is to say, the rectified voltage Vin has a waveform which rises and falls during ½ cycle of the AC voltage. In the embodiment of the disclosure, the rise or fall of the rectified voltage Vin may be understood as meaning the rise or fall of a ripple component. The amount of a driving current for light emission is changed in correspondence to the change of the rectified voltage Vin.

The embodiment of the disclosure includes first to fourth LED light sources LED1 to LED4 as light sources. The first LED light source LED1 and the second LED light source LED2 may be understood as being included in a first light source group, and the third LED light source LED3 and the fourth LED light source LED4 may be understood as being included in a second light source group.

Each of the first LED light source LED1 to the fourth LED light source LED4 may include one light emitting diode or a plurality of light emitting diodes which are connected in series or in parallel. In the case where each of the first LED light source LED1 to the fourth LED light source LED4 includes a plurality of light emitting diodes, it may include light emitting diodes of the same number and the same structure, light emitting diodes of the same number and a different structure, light emitting diodes of a different number and the same structure or light emitting diodes of a different number and a different structure. For the sake of convenience in explanation, each of the first LED light source LED1 to the fourth LED light source LED4 is illustrated by one light emitting diode symbol.

The embodiment of FIG. 1 further includes a mode determination unit 20, balancing circuits 30 and 40, a current control unit 50 and a current path providing circuit 100.

Among them, the mode determination unit 20, the balancing circuit 30 and the current control unit 50 are configured in parallel with the input terminal of the first LED light source LED1 of the first light source group with respect to the rectifier circuit 12. In other words, the rectified voltage Vin is applied in common to the first LED light source LED1, the mode determination unit 20, the balancing circuit 30 and the current control unit 50 which are configured in parallel.

The mode determination unit 20 determines the first mode and the second mode depending on the peak level of the rectified voltage Vin, and provides mode control signals M1 and M2 and current control signals M3 and M4 corresponding to a mode.

In the embodiment of the disclosure, as described above, the rectified voltage Vin corresponding to the rated voltage of 120V is provided in the first mode, and the rectified voltage Vin corresponding to the rated voltage of 277V is provided in the second mode. Therefore, the peak level of the rectified voltage Vin in the second mode is higher than the peak level of the rectified voltage Vin in the first mode.

The mode control signals M1 and M2 and the current control signals M3 and M4 respectively have different levels depending on a mode.

The mode control signal M1 is provided to switching circuits CP1 to CP4 of the current path providing circuit 100, and the mode control signal M2 is provided to the switching circuit CP4. The current control signal M3 is provided to the current control unit 50, and the current control signal M4 is provided to the balancing circuits 30 and 40.

In order to provide the mode control signals M1 and M2 and the current control signals M3 and M4 described above, the mode determination unit 20 includes a voltage sensing section 22, a mode detecting section 24 and a mode control section 26.

The voltage sensing section 22 provides a peak voltage corresponding to the peak level of the rectified voltage Vin. The mode detecting section 24 receives the peak voltage, and provides a mode detection signal which has a different level in each mode depending on the peak voltage. The mode control section 26 receives the mode detection signal, and generates and provides the mode control signals M1 and M2 and the current control signals M3 and M4 corresponding to a mode by the mode detection signal.

Figure 7:
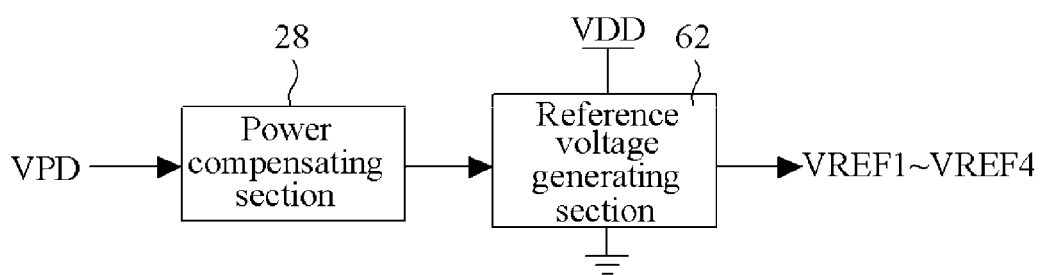
FIG. 7 is a block diagram illustrating the configuration of a power compensating section.

The mode determination unit 20 may further include a power compensating section 28 (see FIG. 7). The power compensating section 28 is configured to generate a power compensation signal corresponding to the peak level of the rectified voltage Vin and provide the power compensation signal to the current path providing circuit 100 for power regulation. The power compensating section 28 will be described later with reference to FIG. 7.

The current control unit 50 is configured to receive the current control signal M3, and, by the current control signal M3, transfer the rectified voltage Vin to the second light source group by bypassing the first light source group, during the entire period of the first mode and a first period of the second mode in which the rectified voltage Vin is lower than a preset control level.

In detail, in correspondence to the current control signal M3, the current control unit 50 turns on a first bypass path that transfers the rectified voltage Vin to the second light source group by bypassing the first light source group, during the entire period of the first mode.

Further, in correspondence to the current control signal M3, the current control unit 50 turns on a second bypass path that transfers the rectified voltage Vin to the second light source group by bypassing the first light source group, during the first period of the second mode. The current control unit 50 turns off the second bypass path during a period other than the first period of the second mode.

The first bypass path and the second bypass path may be understood as current paths that are formed in the current control unit 50, and may be configured to share at least some parts. The detailed configuration and operation of the current control unit 50 will be described later with reference to FIGS. 11 and 12.

The balancing circuit 30 is configured to generate, by the current control signal M4, a comparison voltage of a first balancing level as a different level depending on a mode and provide a first balancing path that transfers the rectified voltage Vin to the second LED light source LED2 by bypassing the first LED light source LED1, in the case where the rectified voltage Vin is lower than the first balancing level of the comparison voltage.

In the case where the balancing circuit 30 provides the first balancing path, the first LED light source LED1 and the second LED light source LED2 are aligned in parallel with respect to the rectified voltage Vin. In the case where the balancing circuit 30 blocks the bypass of the rectified voltage Vin, the first LED light source LED1 and the second LED light source LED2 are aligned in series with respect to the rectified voltage Vin.

The balancing circuit 40 is configured to receive the rectified voltage Vin through the second LED light source LED2 or the current control unit 50. The balancing circuit 40 is configured to generate, by the current control signal M4, a comparison voltage of a second balancing level as a different level depending on a mode and provide a second balancing path that transfers the rectified voltage Vin to the fourth LED light source LED4 by bypassing the third LED light source LED3, in the case where the rectified voltage Vin is lower than the second balancing level of the comparison voltage.

In the case where the balancing circuit 40 provides the second balancing path, the third LED light source LED3 and the fourth LED light source LED4 are aligned in parallel with respect to the rectified voltage Vin. In the case where the balancing circuit 40 blocks the bypass of the rectified voltage Vin, the third LED light source LED3 and the fourth LED light source LED4 are aligned in series with respect to the rectified voltage Vin.

In the first mode, the balancing circuits 30 and 40 equally set the first balancing level and the second balancing level of the respective comparison voltages by the current control signal M4. In this case, turn-off and turn-on timings of the balancing circuits 30 and 40 may be the same during the change of the rectified voltage Vin through one cycle, and timings at which the arrangement states of internal LED light sources in respective light source groups are changed to series or parallel may be the same.

The first balancing level and the second balancing level of the respective comparison voltages of the balancing circuits 30 and 40 may be adjusted for uniform dimming of the respective LED light sources in the first and second light source groups. For instance, each of the LED light sources in the first light source group may be adjusted in timing at which the arrangement state thereof is changed from series to parallel (or from parallel to series) such that a current consumption amount during serial light emission is the same as a current consumption amount during parallel light emission. As a result, each of the LED light sources in the first light source group may implement uniform dimming while maintaining uniform brightness. The second light source group may also implement uniform dimming by being controlled in the same method as the first light source group.

In the second mode, by the current control signals M3 and M4, the second balancing level of the balancing circuit 40 may be set higher than the control level of the current control unit 50, and the first balancing level of the balancing circuit 30 may be set higher than the second balancing level of the balancing circuit 40. As a result, the current control unit 50, the balancing circuit 40 and the balancing circuit 30 may be sequentially turned off and turned on in correspondence to the change of the rectified voltage Vin through one cycle.

The detailed configurations and operations of the balancing circuits 30 and 40 will be described later.

By the above-described configurations of the balancing circuits 30 and 40 and the current control unit 50, in the first mode, the light emission states of the LED light sources in the first light source group and the second light source group are changed in the order of parallel light emission and serial light emission in correspondence to that the rectified voltage Vin rises during one cycle. In the second mode, the light emission states of the LED light sources in the first light source group and the second light source group are changed in the order of light emission of the fourth LED light source LED4, serial light emission of the second LED light source LED2 and the fourth LED light source LED4, serial light emission of the second LED light source LED2 to the fourth LED light source LED4 and serial light emission of the first LED light source LED1 to the fourth LED light source LED4, in correspondence to a rise of the rectified voltage Vin during one cycle.

The current path providing circuit 100 includes switching circuits CP1 to CP4 and sensing resistors Rs1 and Rs2. It may be assumed that the sensing resistor Rs1 which is connected in common to the switching circuits CP1 and CP2 and the sensing resistor Rs2 which is connected in common to the switching circuits CP3 and CP4 have the same resistance value for the sake of convenience in explanation.

The switching circuits CP1 to CP3 are configured to receive the mode control signal M1, and the switching circuit CP4 is configured to receive the mode control signals M1 and M2. The switching circuit CP4 provides a different current path depending on a mode. A current path for the first mode is configured to be controlled by the mode control signal M1, and a current path for the second mode is configured to be controlled by the mode control signal M2. The detailed configurations of the switching circuits CP1 to CP4 will be described later with reference to FIG. 2.

In the first mode, the current path providing circuit 100 provides a current path in correspondence to each of the first light source group and the second light source group. In the first mode, the current path providing circuit 100 provides a current path for each of the first LED light source LED1 to the fourth LED light source LED4, or provides current paths for the second LED light source LED2 of the first light source group and the fourth LED light source LED4 of the second light source group.

In the second mode, the current path providing circuit 100 provides a current path to the fourth LED light source LED4 of the second light source group. The current path in the second mode is provided in correspondence to the light emission of the first LED light source LED1 to the fourth LED light source LED4 whose serial connection state is changed according to the sequential turn-off and turn-on of the current control unit 50 and the balancing circuits 30 and 40 in correspondence to the change of the rectified voltage Vin through one cycle.

Figure 2:
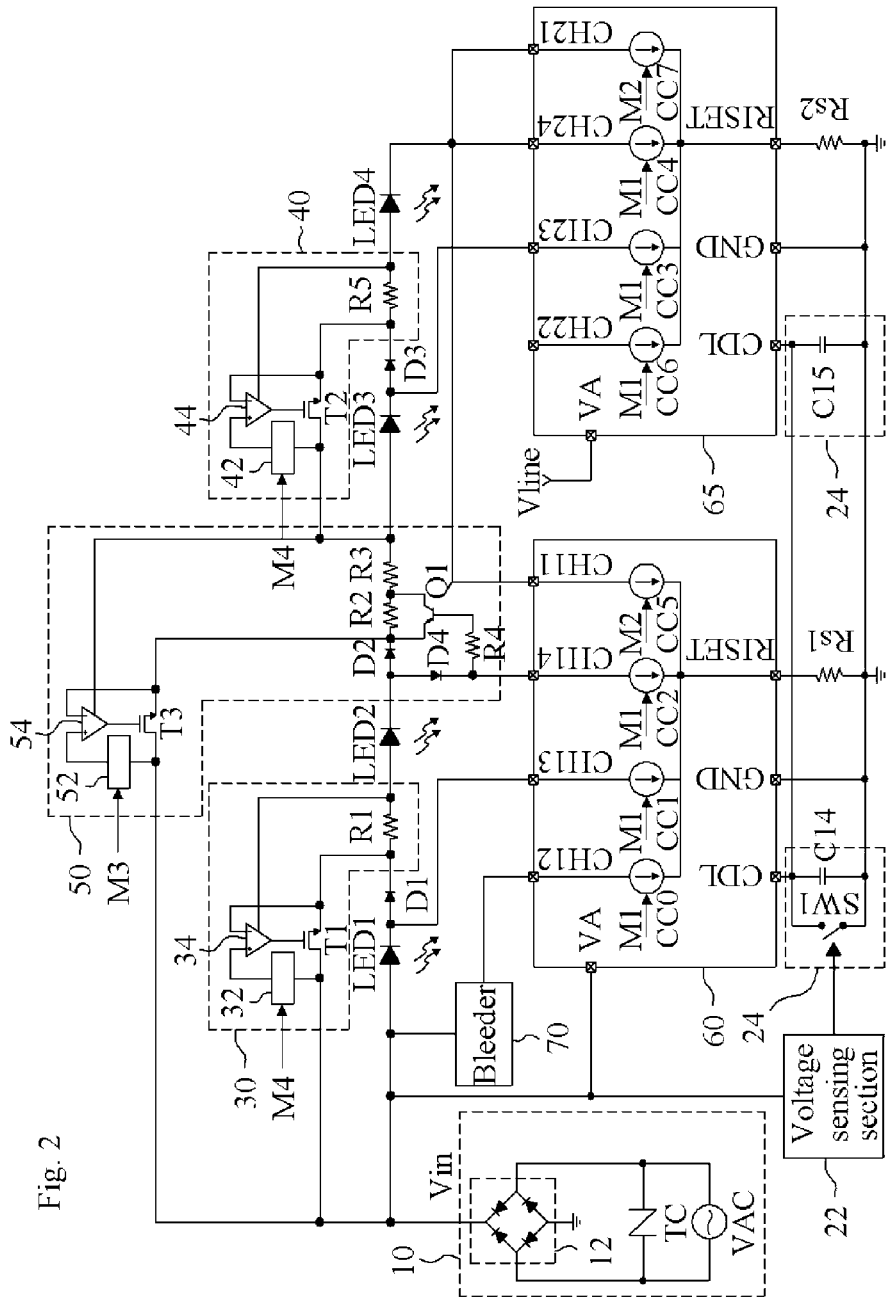
FIG. 2 is a detailed circuit diagram corresponding to the embodiment of FIG. 1.

In the configuration of FIG. 1, the current path providing circuit 100 may be configured using drivers 60 and 65 as illustrated in FIG. 2. The mode control section 26 and the power compensating section 28 may be disposed inside or outside the drivers 60 and 65.

The embodiment of the disclosure may further include a bleeder in correspondence to the configuration of the dimmer TC.

FIG. 2 is a circuit diagram corresponding to the embodiment of FIG. 1. Unlike FIG. 1, the circuit diagram of FIG. 2 may be understood as including the mode control section 26 and the power compensating section 28 which are disposed in drivers, and includes a bleeder 70.

Figure 3:
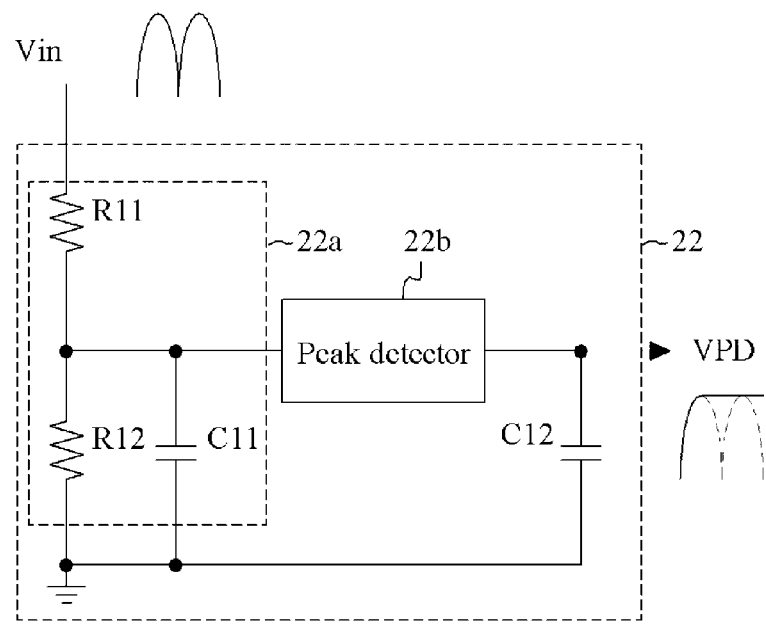
FIG. 3 is a detailed diagram illustrating a voltage sensing section of FIG. 1.

The voltage sensing section 22 of FIG. 2 may be described with reference to FIG. 3.

The voltage sensing section 22 includes an input circuit 22a, a peak detector 22b and a capacitor C12.

The input circuit 22a includes resistors R11 and R12 which are connected in series to divide the rectified voltage Vin and a capacitor C11 which is connected in parallel to the resistor R12. The input circuit 22a charges, into the capacitor C11, a voltage which is applied to the resistor R12 as the rectified voltage Vin is divided.

The peak detector 22b outputs a peak voltage VPD which is obtained by detecting a peak level of the charging voltage of the capacitor C11. The capacitor C12 stabilizes the output level of the peak voltage VPD.

The voltage sensing section 22 outputs the peak voltage VPD corresponding to a level obtained by sensing and smoothing the rectified voltage Vin. The peak voltage VPD has a low level in correspondence to the rectified voltage Vin with the rated voltage of 120V, and has a high level in correspondence to the rectified voltage Vin with the rated voltage of 277V.

Figure 4:
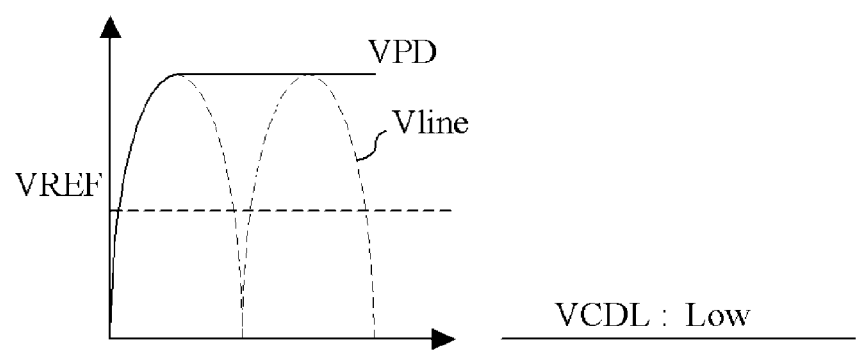
FIG. 4 is a waveform diagram to assist in the explanation of the determination of a second mode depending on a peak voltage.
Figure 5:
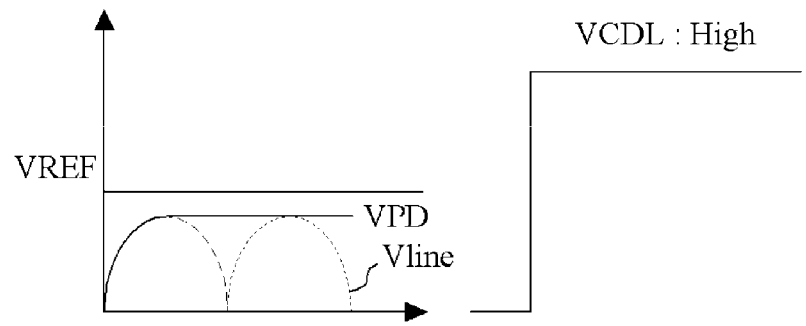
FIG. 5 is a waveform diagram to assist in the explanation of the determination of a first mode depending on a peak voltage.

The mode detecting section 24 outputs a mode detection signal VCDL having a low level in the case where the level of the peak voltage VPD is high as illustrated in FIG. 4, and outputs the mode detection signal VCDL having a high level in the case where the level of the peak voltage VPD is low as illustrated in FIG. 5.

In FIG. 2, a voltage applied to each of terminals CDL of the drivers 60 and 65 may be understood as the mode detection signal VCDL.

The mode detecting section 24 of FIG. 2 is configured such that a switch SW1 is turned on or turned off depending on a level of the peak voltage VPD and charging and discharging of capacitors C14 and C15 is controlled depending on a switching state of the switch SW1. As the charging and discharging of the capacitors C14 and C15 is controlled, the mode detection signal VCDL of each of the terminals CDL of the drivers 60 and 65 is determined. The capacitors C14 and C15 are discharged in the case where the switch SW1 is turned on by a constant voltage in the drivers 60 and 65 and are charged in the case where the switch SW1 is turned off, and each provide a voltage in the charged or discharged state, as the mode detection signal VCDL.

However, the mode detecting section 24 may be configured to output the mode detection signal VCDL having a high level or a low level by determining the peak voltage VPD based on a preset reference voltage VREF as illustrated in FIGS. 4 and 5.

Figure 6:
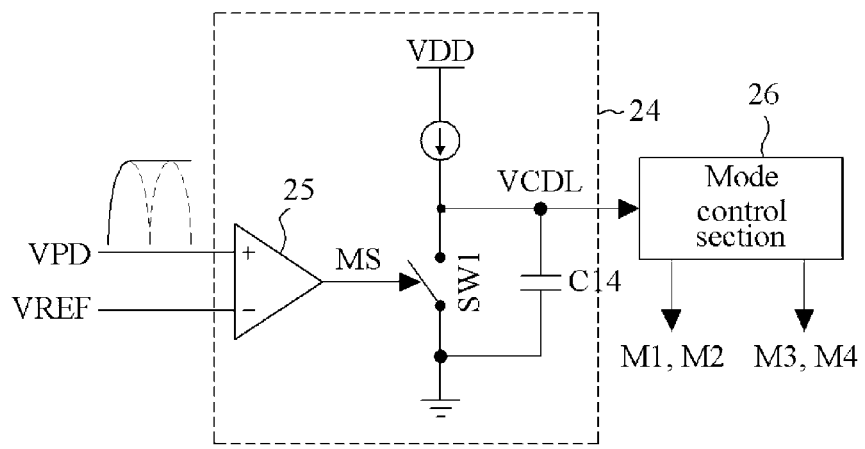
FIG. 6 is a detailed circuit diagram of a mode detecting section and a mode control section of FIG. 1.

In addition, the mode detecting section 24 may be configured as illustrated in FIG. 6.

In FIG. 6, the mode detecting section 24 may be understood as being configured outside the drivers 60 and 65, and the mode control section 26 may be understood as being configured in the respective drivers 60 and 65.

The mode detecting section 24 includes a comparator 25 which compares the peak voltage VPD applied to a positive terminal (+) and a reference voltage VREF applied to a negative terminal (−), a switch SW1 which is turned on or turned off by a comparison signal MS of the comparator 25, and a capacitor C14. The switch SW1 and the capacitor C14 are the same as those of the mode detecting section 24 of FIG. 2, and thus, are denoted by the same reference symbols.

The comparator 25 determines whether the peak voltage VPD is higher or lower than the reference voltage VREF, and outputs a comparison result as the comparison signal MS.

When the peak voltage VPD is higher than the reference voltage VREF, the comparator 25 outputs the comparison signal MS having a high level, and thereby, turns on the switch SW1. If the switch SW1 is turned on, the charging voltage of the capacitor C14 is discharged, and the capacitor C14 has the charging voltage of a low level as illustrated in FIG. 4. The charging voltage of the capacitor C14 which has a low level is provided to the mode control section 26 as the mode detection signal VCDL of a low level through each of the terminals CDL of the drivers 60 and 65.

When the peak voltage VPD is lower than the reference voltage VREF, the comparator 25 outputs the comparison signal MS having a low level, and thereby, turns off the switch SW1. If the switch SW1 is turned off, the capacitor C14 is charged with a constant voltage VDD, and has the charging voltage of a high level as illustrated in FIG. 5. The charging voltage of the capacitor C14 which has a high level is provided to the mode control section 26 as the mode detection signal VCDL of a high level through each of the terminals CDL of the drivers 60 and 65.

The mode control section 26 receives the mode detection signal VCDL, and outputs the mode control signals M1 and M2 and the current control signals M3 and M4 in correspondence to the level of the mode detection signal VCDL.

The mode determination unit 20 may further include a power compensating section 28 as illustrated in FIG. 7, for power regulation.

The power compensating section 28 may receive the peak voltage VPD, may generate therein a power compensation signal corresponding to the level of the peak voltage VPD, and may output the power compensation signal for power regulation of a current path formed in the second mode.

For example, the power compensating section 28 may be configured to provide the power compensation signal to a reference voltage generating section 62 in the drivers 60 and 65 as illustrated in FIG. 7.

The reference voltage generating section 62 is to provide reference voltages VREF1 to VREF4 having different levels to switching circuits CC0 to CC7 which are configured in the drivers 60 and 65. The reference voltage VREF1 is provided to the switching circuits CC5 and CC7 and has a lowest level, the reference voltage VREF2 is provided to the switching circuits CC0 and CC6, the reference voltage VREF3 is provided to the switching circuits CC1 and CC3, and the reference voltage VREF4 is provided to the switching circuits CC2 and CC4 and has a highest level. Namely, the reference voltages VREF1, VREF2, VREF3 and VREF4 have gradually higher levels in that order.

The reference voltage generating section 62 changes the levels of the reference voltages VREF1 to VREF4 in correspondence to a change in the level of the power compensation signal of the power compensating section 28. That is to say, if the level of the peak voltage VPD rises as the peak level of the rectified voltage Vin rises, the reference voltage generating section 62 lowers the levels of the reference voltages VREF1 to VREF4 by the power compensation signal in order to reduce amounts of current in correspondence to the rise in voltage. Conversely, if the level of the peak voltage VPD falls as the peak level of the rectified voltage Vin falls, the reference voltage generating section 62 raises the levels of the reference voltages VREF1 to VREF4 by the power compensation signal in order to increase amounts of current in correspondence to the fall in voltage.

The reference voltages VREF1 to VREF4 serve as references for limiting the amounts of current flowing through the switching circuits CC0 to CC7. The amounts of current flowing through the switching circuits CC0 to CC7 are reduced in the case where the reference voltages VREF1 to VREF4 are raised and are increased in the case where the reference voltages VREF1 to VREF4 are lowered.

As a result, by providing the power compensation signal for power regulation, the power compensating section 28 may control the amount of current of a current path connected to the fourth LED light source LED4 in the second mode, to correspond to a variation in the peak level of the rectified voltage Vin, as will be described later.

Figure 8:
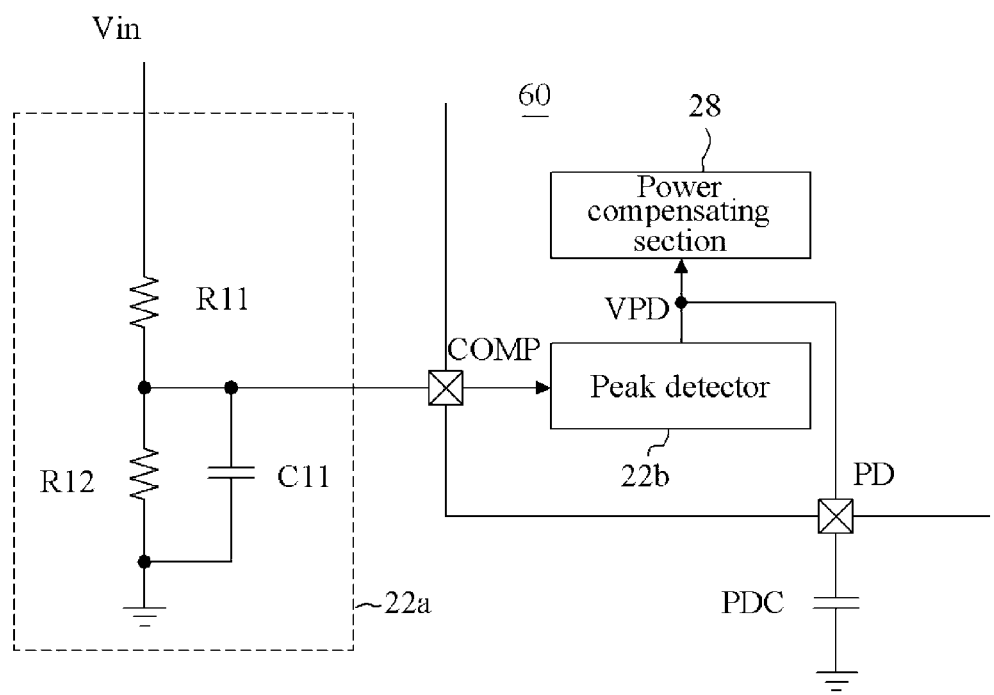
FIG. 8 is a block diagram illustrating a case where the power compensating section is configured in a driver 60.

As illustrated in FIG. 8, the peak detector 22b and the power compensating section 28 may be configured to be included in the drivers 60 and 65. For the sake of convenience in explanation, it will be described that the peak detector 22b and the power compensating section 28 are configured in the driver 60.

In this case, among the components of the voltage sensing section 22, the input circuit 22a is configured outside the driver 60, and the peak detector 22b is configured inside the driver 60. The output of the input circuit 22a is transferred to the peak detector 22b in the driver 60, through a terminal COMP of the driver 60.

The peak detector 22b may apply the peak voltage VPD to the power compensating section 28 and a terminal PD of the driver 60, and the peak voltage VPD applied to the terminal PD may be charged to an external capacitor PDC.

Figure 9:
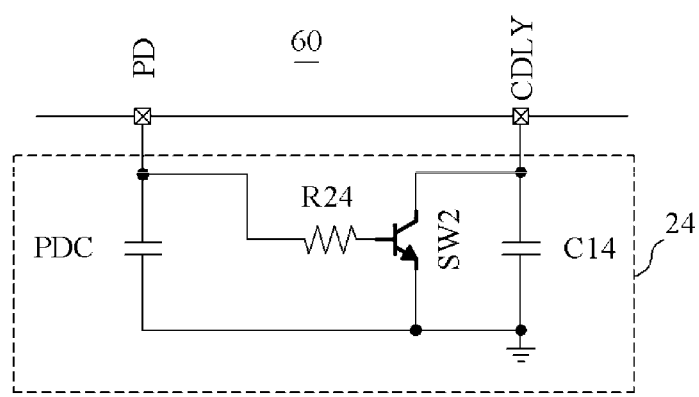
FIG. 9 is a circuit diagram illustrating the configuration of the mode detecting section.

The peak voltage VPD applied to the terminal PD of the driver 60 may be transferred to a mode determining section 24 as illustrated in FIG. 9 configured as an embodiment different from that of FIG. 2.

Referring to FIG. 9, the mode determining section 24 is configured outside the driver 60, and includes the capacitor PDC of FIG. 8, a resistor R24, a switch SW2 and a capacitor C14.

The resistor R24 transfers the peak voltage VPD of the capacitor PDC to the base of the switch SW2, and the capacitor C14 is configured between an emitter and a collector of the switch SW2. The collector of the switch SW2 and one end of the capacitor C14 are connected to a terminal CDLY of the driver 60.

By the above-described configuration, the switch SW2 may be switched in correspondence to the level of the peak voltage VPD, and, depending on a switching state of the switch SW2, the capacitor C14 may perform charging by a voltage applied through the terminal CDLY or may discharge a charging voltage through the switch SW2.

Therefore, the mode determining section 24 provides a voltage, in a state in which it is charged to or discharged from the capacitor C14 in correspondence to the peak voltage VPD, as the mode detection signal VCDL.

The embodiment of FIG. 2 includes the two drivers 60 and 65.

The driver 60 is configured to have terminals CH11 to CH14 for input of current, the terminal CDL to which the mode detection signal VCDL is applied, a ground terminal GND for grounding, a terminal RISET which forms a current path and is used for feedback of a sensing voltage, and a terminal VA to which an input voltage is applied to generate an internal constant voltage. The driver 65 is also configured to have terminals CH21 to CH24 for input of current, and is configured to have a terminal CDL, a ground terminal GND, a terminal RISET and a terminal VA for the same uses as those of the driver 60.

In the above configuration, each of the drivers 60 and 65 generates a constant voltage therein in correspondence to the input voltage applied through the terminal VA, and the constant voltage may be used to generate the reference voltages VREF1 to VREF4. A voltage which is obtained by dividing the rectified voltage Vin may be used as the input voltage of the terminal VA.

The sensing resistors Rs1 and Rs2 are connected to the terminals RISET of the drivers 60 and 65, respectively, and the sensing resistors Rs1 and Rs2 and the ground terminals GND of the drivers 60 and 65 are configured to be connected in common to the ground.

The driver 60 includes therein the switching circuits CC0, CC1, CC2 and CC5. The switching circuit CC0 is configured between the terminal CH12 and the terminal RISET, the switching circuit CC1 is configured between the terminal CH13 and the terminal RISET, the switching circuit CC2 is configured between the terminal CH14 and the terminal RISET, and the switching circuit CC5 is configured between the terminal CH11 and the terminal RISET. That is to say, in the switching circuits CC0, CC1, CC2 and CC5, current output sides are connected to the terminal RISET through a common node, and current input sides are connected to the terminals CH12, CH13, CH14 and CH11, respectively.

The switch circuits CC0, CC1 and CC2 are controlled in their switching operations by the mode control signal M1 and are normally turned on in the first mode, and the switch circuit CC5 is controlled in its switching operation by the mode control signal M2 and is normally turned on in the second mode.

The driver 65 includes therein the switching circuits CC6, CC3, CC4 and CC7. The switching circuit CC6 is configured between the terminal CH22 and the terminal RISET, the switching circuit CC3 is configured between the terminal CH23 and the terminal RISET, the switching circuit CC4 is configured between the terminal CH24 and the terminal RISET, and the switching circuit CC7 is configured between the terminal CH21 and the terminal RISET. That is to say, in the switching circuits CC6, CC3, CC4 and CC7, current output sides are connected to the terminal RISET through a common node, and current input sides are connected to the terminals CH22, CH23, CH24 and CH21, respectively.

The switch circuits CC6, CC3 and CC4 are controlled in their switching operations by the mode control signal M1 and are normally turned on in the first mode, and the switch circuit CC7 is controlled in its switching operation by the mode control signal M2 and is normally turned on in the second mode.

When comparing FIGS. 1 and 2, the switching circuit CP1 of FIG. 1 corresponds to the switching circuit CC1 of the driver 60 of FIG. 2, the switching circuit CP2 of FIG. 1 corresponds to the switching circuit CC2 of the driver 60 of FIG. 2, and the switching circuit CP3 of FIG. 1 corresponds to the switching circuit CC3 of the driver 65 of FIG. 2. Therefore, the switching circuit CC1 of the driver 60 of FIG. 2 is connected to the first LED light source LED1 through the terminal CH13, the switching circuit CC2 of the driver 60 of FIG. 2 is connected to the second LED light source LED2 through the terminal CH14, and the switching circuit CC3 of the driver 65 of FIG. 2 is connected to the third LED light source LED3 through the terminal CH23.

The switching circuit CC0 of the driver 60 is to be connected to the bleeder 70 through the terminal CH12. The bleeder 70 which is configured outside the driver 60 receives the rectified voltage Vin, and discharges current through the switching circuit CC0 which maintains a turn-on state during a period in which light sources, that is, a first light source and a second light source, are extinguished. The bleeder 70 is a component which is configured in correspondence to the dimmer TC. The bleeder 70 provides a current path for blocking current from flowing to the light sources in the case where the light sources are extinguished by the dimmer TC. The bleeder 70 provides a current path for blocking current from flowing to the light sources during a period in which the light sources are extinguished during one cycle of the rectified voltage Vin. The bleeder 70 is illustrated in FIG. 2 and is omitted in FIG. 1.

The switching circuit CC6 of the driver 65 is connected to the terminal CH22, and is not involved in the operation of the embodiment of the disclosure. The embodiment of the disclosure illustrates the configuration of a current path providing circuit using the drivers 60 and 65 having the same structure. Accordingly, the switching circuit CC0 connected to the terminal CH22 exists as a dummy channel.

The switching circuit CP4 of FIG. 1 corresponds to the switching circuits CC4, CC5 and CC7 of the drivers 60 and 65 of FIG. 2.

In the first mode, the switching circuit CP4 of FIG. 1 is formed by the switching circuit CC4 of FIG. 2. In the second mode, the switching circuit CP4 of FIG. 1 is formed by the switching circuits CC5 and CC7 of FIG. 2.

The switching circuit CP4 of FIG. 1 is configured to be connected to the fourth LED light source LED4, and the switching circuits CC4, CC5 and CC7 of FIG. 2 are also connected in common to the fourth LED light source LED4 through the terminals CH11, CH24 and CH21.

Figure 10:
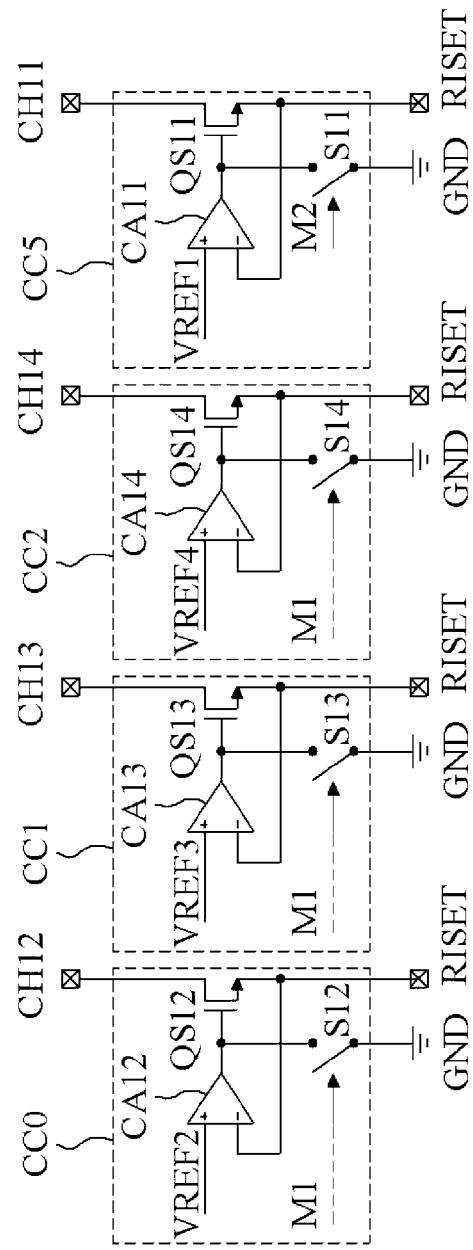
FIG. 10 is a detailed circuit diagram of the driver 60 of FIG. 2.
Figure 11:
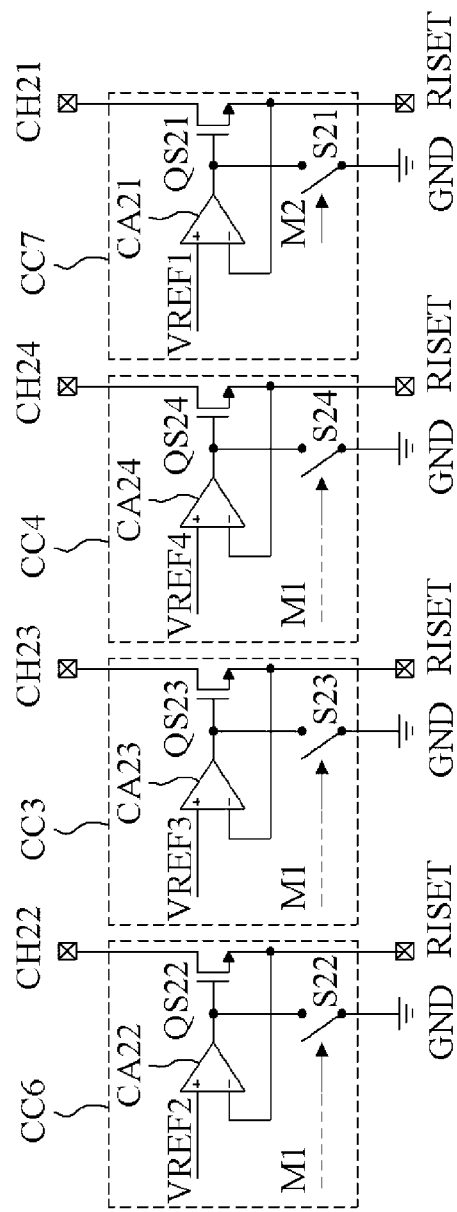
FIG. 11 is a detailed circuit diagram of a driver 65 of FIG. 2.

In detail, the switching circuits CC0, CC1, CC2 and CC5 of the driver 60 of FIG. 2 may be exemplified as illustrated in FIG. 10, and the switching circuits CC6, CC3, CC4 and CC7 of the driver 65 of FIG. 2 may be exemplified as illustrated in FIG. 11.

Referring to FIG. 10, the switching circuits CC0, CC1, CC2 and CC5 each include the same structure having a comparator, an NMOS transistor as a switching element and a switch. In detail, the switching circuit CC0 includes a comparator CA12 having a non-inverting terminal to which the reference voltage VREF2 is applied and an inverting terminal to which the sensing voltage of the sensing resistor Rs1 fed back through the terminal RISET is applied, an NMOS transistor QS12 having a drain and a source which are connected to the terminal CH12 and the terminal RISET, respectively, and a gate to which the output of the comparator CA12 is applied, and a switch S12 which is configured between a node, between the comparator CA12 and the gate of the NMOS transistor QS12, and the ground GND and of which switching is controlled by the mode control signal M1. The switching circuit CC1 includes a comparator CA13 having a non-inverting terminal to which the reference voltage VREF3 is applied and an inverting terminal to which the sensing voltage of the sensing resistor Rs1 fed back through the terminal RISET is applied, an NMOS transistor QS13 having a drain and a source which are connected to the terminal CH13 and the terminal RISET, respectively, and a gate to which the output of the comparator CA13 is applied, and a switch S13 which is configured between a node, between the comparator CA13 and the gate of the NMOS transistor QS13, and the ground GND and of which switching is controlled by the mode control signal M1. The switching circuit CC2 includes a comparator CA14 having a non-inverting terminal to which the reference voltage VREF4 is applied and an inverting terminal to which the sensing voltage of the sensing resistor Rs1 fed back through the terminal RISET is applied, an NMOS transistor QS14 having a drain and a source which are connected to the terminal CH14 and the terminal RISET, respectively, and a gate to which the output of the comparator CA14 is applied, and a switch S14 which is configured between a node, between the comparator CA14 and the gate of the NMOS transistor QS14, and the ground GND and of which switching is controlled by the mode control signal M1. The switching circuit CC5 includes a comparator CA11 having a non-inverting terminal to which the reference voltage VREF1 is applied and an inverting terminal to which the sensing voltage of the sensing resistor Rs1 fed back through the terminal RISET is applied, an NMOS transistor QS11 having a drain and a source which are connected to the terminal CH11 and the terminal RISET, respectively, and a gate to which the output of the comparator CA11 is applied, and a switch S11 which is configured between a node, between the comparator CA11 and the gate of the NMOS transistor QS11, and the ground GND and of which switching is controlled by the mode control signal M2.

Referring to FIG. 11, the switching circuits CC6, CC3, CC4 and CC7 each include the same structure having a comparator, an NMOS transistor as a switching element and a switch. In detail, the switching circuit CC6 includes a comparator CA22 having a non-inverting terminal to which the reference voltage VREF2 is applied and an inverting terminal to which the sensing voltage of the sensing resistor Rs2 fed back through the terminal RISET is applied, an NMOS transistor QS22 having a drain and a source which are connected to the terminal CH22 and the terminal RISET, respectively, and a gate to which the output of the comparator CA22 is applied, and a switch S22 which is configured between a node, between the comparator CA22 and the gate of the NMOS transistor QS22, and the ground GND and of which switching is controlled by the mode control signal M1. The switching circuit CC3 includes a comparator CA23 having a non-inverting terminal to which the reference voltage VREF3 is applied and an inverting terminal to which the sensing voltage of the sensing resistor Rs2 fed back through the terminal RISET is applied, an NMOS transistor QS23 having a drain and a source which are connected to the terminal CH23 and the terminal RISET, respectively, and a gate to which the output of the comparator CA23 is applied, and a switch S23 which is configured between a node, between the comparator CA23 and the gate of the NMOS transistor QS23, and the ground GND and of which switching is controlled by the mode control signal M1. The switching circuit CC4 includes a comparator CA24 having a non-inverting terminal to which the reference voltage VREF4 is applied and an inverting terminal to which the sensing voltage of the sensing resistor Rs2 fed back through the terminal RISET is applied, an NMOS transistor QS24 having a drain and a source which are connected to the terminal CH24 and the terminal RISET, respectively, and a gate to which the output of the comparator CA24 is applied, and a switch S24 which is configured between a node, between the comparator CA24 and the gate of the NMOS transistor QS24, and the ground GND and of which switching is controlled by the mode control signal M1. The switching circuit CC7 includes a comparator CA21 having a non-inverting terminal to which the reference voltage VREF1 is applied and an inverting terminal to which the sensing voltage of the sensing resistor Rs2 fed back through the terminal RISET is applied, an NMOS transistor QS21 having a drain and a source which are connected to the terminal CH21 and the terminal RISET, respectively, and a gate to which the output of the comparator CA21 is applied, and a switch S21 which is configured between a node, between the comparator CA21 and the gate of the NMOS transistor QS21, and the ground GND and of which switching is controlled by the mode control signal M2.

In the above configuration, the reference voltages VREF1 to VREF4 of the driver 60 may be understood as having the same levels as the reference voltages VREF1 to VREF4 of the driver 65.

The reference voltage VREF1 may be set to have a level higher than a sensing voltage corresponding to driving current Iin of the peak value of the rectified voltage Vin in the second mode such that the NMOS transistors QS11 and QS21 can maintain turn-on states during the second mode to provide a current path corresponding to light emission in the second mode.

The reference voltage VREF2 may be set to have a level lower than a sensing voltage corresponding to the driving current Iin at a time at which the first LED light source LED1 of the first light source group and the third LED light source LED3 of the second light source group start to emit light, during the change of the rectified voltage Vin through one cycle in the first mode. Depending on the level of the reference voltage VREF2, the NMOS transistors QS12 and QS22 may maintain turn-on states until the first and second light source groups emit light in the first mode.

The reference voltage VREF3 may be set to have a level lower than a sensing voltage corresponding to the driving current Iin at a time at which the LED light sources of the first and second light source groups emit light in series, during the change of the rectified voltage Vin through one cycle in the first mode. Depending on the level of the reference voltage VREF3, the NMOS transistors QS13 and QS23 may maintain turn-on states until the LED light sources of the first and second light source groups emit light in series in the first mode.

The reference voltage VREF4 may be set to have a level higher than a sensing voltage corresponding to the driving current Iin of the peak value of the rectified voltage Vin in the first mode. Depending on the reference voltage VREF4, the NMOS transistors QS14 and QS24 may maintain turn-on states to allow the LED light sources of the first and second light source groups to emit light in series in the first mode.

In FIGS. 10 and 11, the comparators CA11 to CA14 and CA21 to CA24 and the NMOS transistors QS11 to QS14 and QS21 to QS24 of the switching circuits CC0 to CC7 perform operations of comparing reference voltages and sensing voltages and thereby executing current control while providing current paths and blocking the current paths when the sensing voltages are higher than the reference voltages. The switches S11 to S14 and S21 to S24 of the switching circuits CC0 to CC7 perform operations of turning off NMOS transistors depending on a mode and thereby switching the current paths formed by the NMOS transistors.

Figure 12:
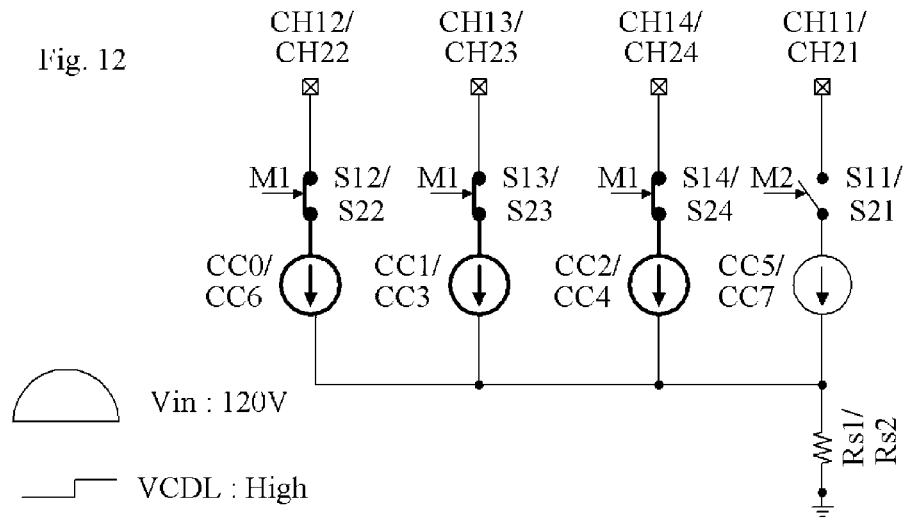
FIG. 12 is a detailed circuit diagram of a current control unit to assist in the explanation of the operation of a first mode.
Figure 13:
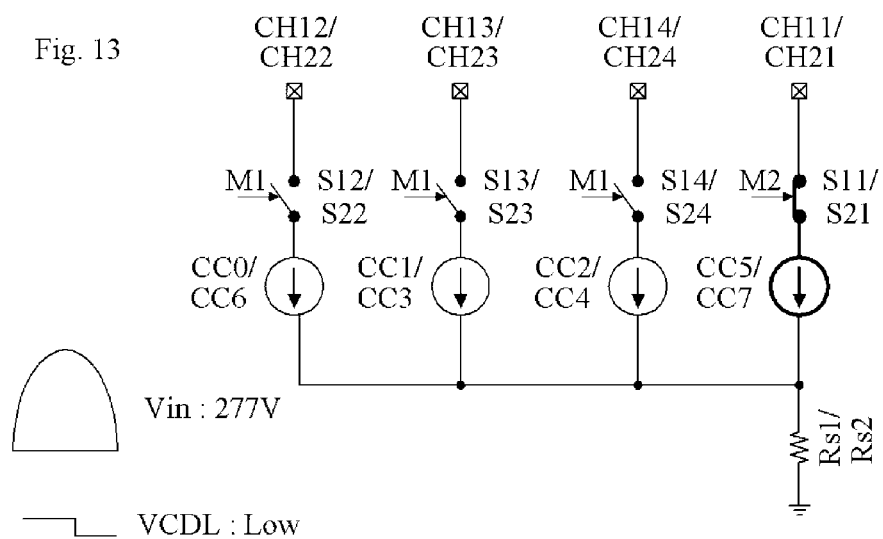
FIG. 13 is a detailed circuit diagram of the current control unit to assist in the explanation of the operation of a second mode.

The drivers 60 and 65 described above may be equivalently expressed as illustrated in FIGS. 12 and 13. Here, the switches S11, S21, S12, S22, S13, S23, S14 and S24 of FIGS. 10 and 11 are equivalently expressed as switching current paths in FIGS. 12 and 13, and the comparators and the NMOS transistors of the respective switching circuits CC0 to CC7 of FIGS. 10 and 11 are equivalently represented as current sources forming the current paths in FIGS. 12 and 13.

In the first mode, the drivers 60 and 65 may provide current paths corresponding to light emission in the first mode, by turning on the switches S12, S22, S13, S23, S14 and S24 by the mode control signal M1 corresponding to the mode detection signal VCDL of a high level as illustrated in FIG. 12. The switches S11 and S21 of the drivers 60 and 65 are turned off by the mode control signal M2.

In the second mode, the drivers 60 and 65 may provide current paths corresponding to light emission in the second mode, by turning on the switches S11 and S21 by the mode control signal M2 corresponding to the mode detection signal VCDL of a low level as illustrated in FIG. 13. The switches S12, S22, S13, S23, S14 and S24 of the drivers 60 and 65 are turned off by the mode control signal M1.

In FIG. 2, the output terminal of the first LED light source LED1 is connected to the terminal CH13 of the driver 60, and is connected to the second LED light source LED2 through a diode D1 and a resistor R1 which are connected in series. The output terminal of the second LED light source LED2 is connected to the terminal CH14 of the driver 60, and is connected to the third LED light source LED3 through a diode D2, a resistor R2 and a resistor R3 which are connected in series. The output terminal of the third LED light source LED3 is connected to the terminal CH23 of the driver 65, and is connected to the fourth LED light source LED4 through a diode D3 and a resistor R5 which are connected in series. The output terminal of the fourth LED light source LED4 is connected to the terminal CH24 of the driver 65.

In the above description, the diodes D1, D2 and D3 are to block the flow of current in a reverse direction. The resistor R1 is included in the balancing circuit 30, the resistors R2 and R3 are included in the current control unit 50, and the resistor R5 is included in the balancing circuit 40.

The first to fourth LED light sources LED1 to LED4 configured as mentioned above are divided into the first light source group and the second light source group by the current control unit 50.

The current control unit 50 is configured to maintain a turn-on state during the entire period of the first mode and thereby transfer the rectified voltage Vin to the second light source group by bypassing the first LED light source LED1 and the second LED light source LED2 being the first light source group. Further, the current control unit 50 is configured to transfer the rectified voltage Vin to the second light source group by bypassing the first light source group during the first period of the second mode in which the rectified voltage Vin is lower than the preset control level.

To this end, the current control unit 50 includes a comparison voltage providing section 52, a comparator 54, a switch T3, a switch Q1 and a load circuit which includes the resistors R2 and R3 connected in series, as illustrated in FIG. 2.

The comparison voltage providing section 52 is configured to provide a comparison voltage which has a first control level in the first mode and a second control level lower than the first control level in the second mode, in correspondence to the current control signal M3. The comparison voltage providing section 52 is configured between the output terminal of the rectifier circuit 12, from which the rectified voltage Vin is outputted, and a positive terminal (+) of the comparator 54.

The comparator 54 is configured to compare the load voltage of the load circuit and the comparison voltage of the comparison voltage providing section 52 and apply a voltage corresponding to a comparison result to the gate of the switch T3.

The switch T3 may be constituted by an NMOS transistor, and is configured such that the drain thereof is connected to the output terminal of the rectifier circuit 12 from which the rectified voltage Vin is outputted and the source thereof is connected to the resistor R2 of the load circuit. By the above-described configuration, the switch T3 selectively transfers the rectified voltage Vin of the rectifier circuit 12 by the output of the comparator 54.

The switch Q1 may be constituted by a PNP bipolar transistor, and has an emitter and a collector between which the resistor R2 is connected and a base which is connected to a resistor R4 sensing the current outputted from the second LED light source LED2. The resistor R4 is connected to a node between a diode D4, connected to the output terminal of the second LED light source LED2, and the terminal CH14 of the driver 60 in order to sense the current flowing from the second LED light source LED2 to the terminal CH14 of the driver 60, and applies a sensed voltage to the base of the switch Q1. The diode D4 is to prevent current from flowing to the second LED light source LED2.

The switch Q1 is turned off by a high voltage applied to the resistor R4 when current is outputted from the second LED light source LED2, and is turned on by a low voltage applied to the resistor R4 when current is not outputted from the second LED light source LED2. In other words, the switch Q1 is turned on in the first mode and is turned off in the second mode.

The load circuit includes the resistors R2 and R3 which are connected in series between the first light source group and the second light source group. The resistor R2 is connected to the output terminal of the switch T3 and the second LED light source LED2 of the first light source group, and is configured in parallel with the switch Q1.

By the above-described configuration, the resistance value of the load circuit is changed by the switching operation of the switch Q1, and a load voltage corresponding to an amount of current is generated. The load voltage may be applied to a negative terminal (−) of the comparator 54 through a node between the resistor R2 and the switch T3. A voltage of a node between the resistor R3 and the third LED light source LED3 of the second light source group may be provided as an operating voltage of the comparator 54.

Figure 14:
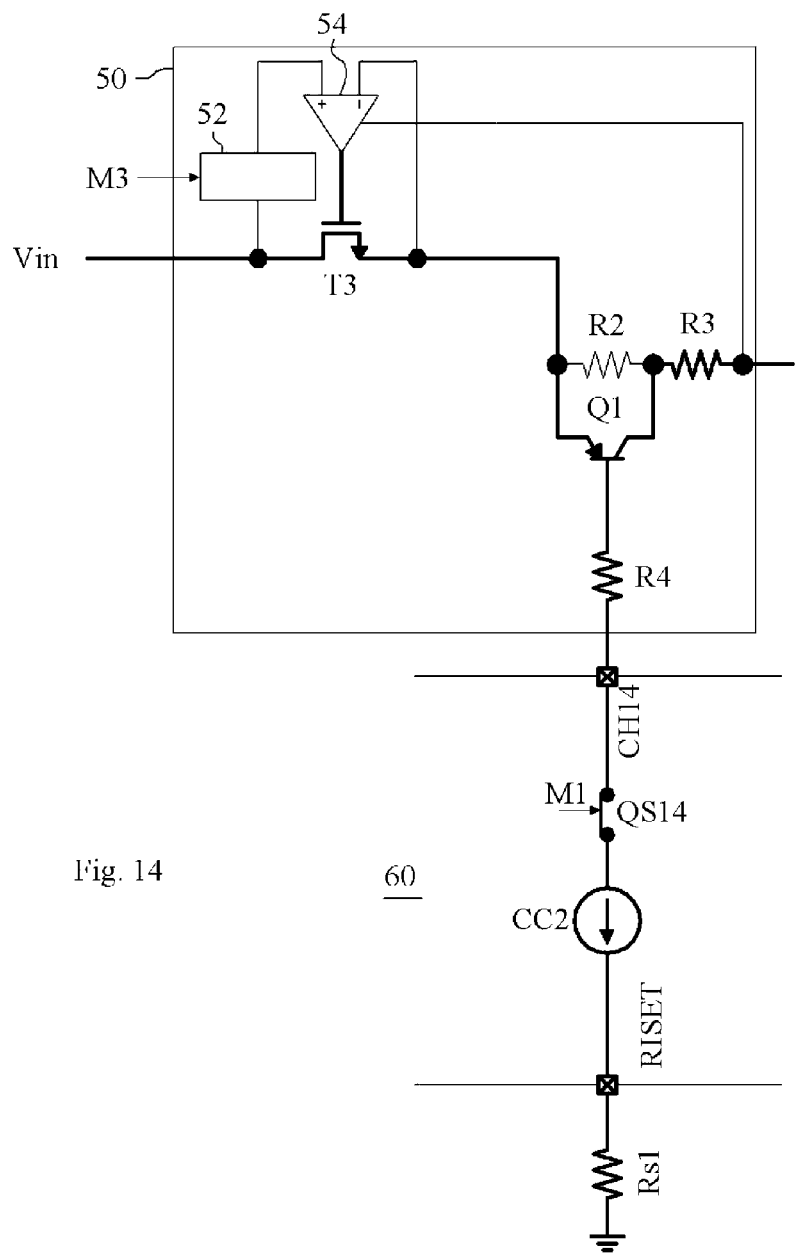
FIG. 14 is a block diagram to assist in the explanation of the operation of a current path control circuit in the first mode.
Figure 15:
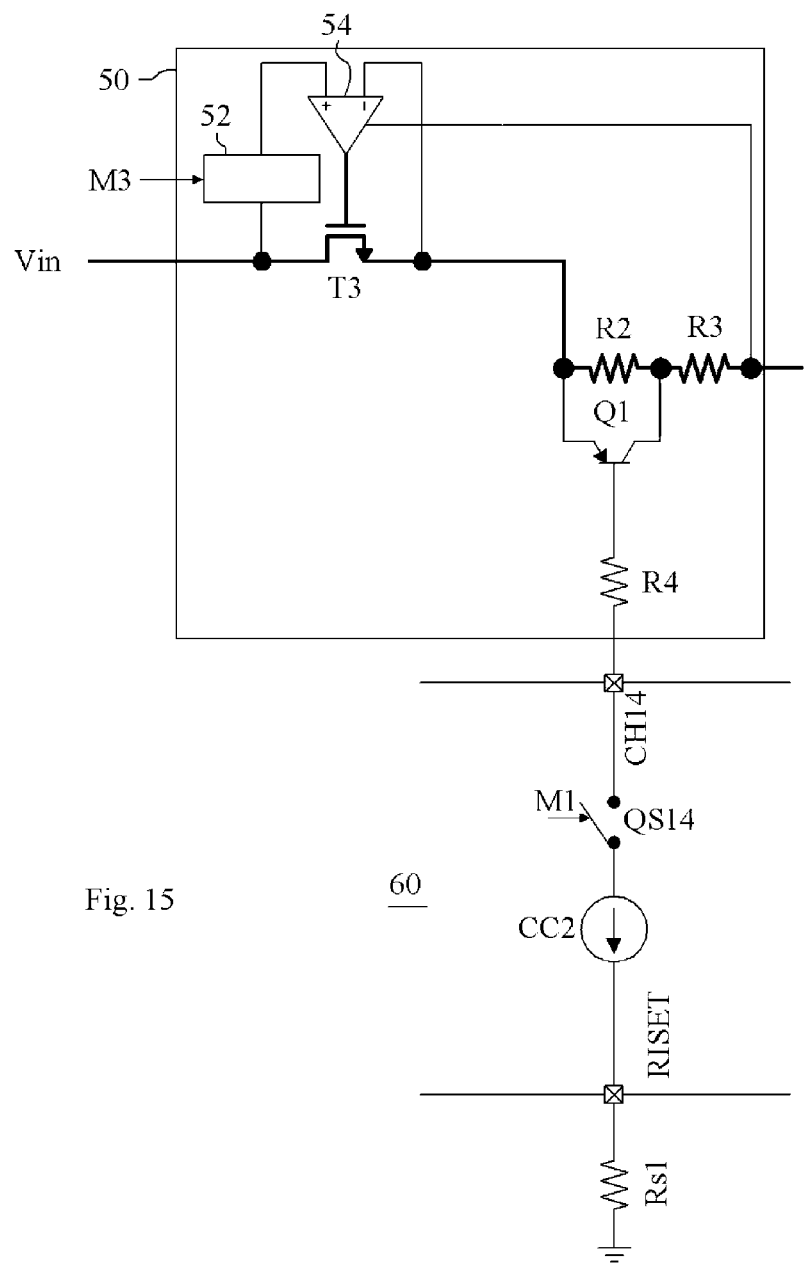
FIG. 15 is a block diagram to assist in the explanation of the operation of the current path control circuit in the second mode.

The current control unit 50 configured as described above is operated in the first mode as illustrated in FIG. 14, and is operated in the second mode as illustrated in FIG. 15. In FIGS. 14 and 15, the switching circuit CC2 of the driver 60 is equivalently expressed as in FIGS. 12 and 13.

Referring to FIG. 14, in the first mode, the switching circuit CC2 of the driver 60 is turned on by the mode control signal M1.

In the first mode, while the second LED light source LED2 emits light, the current outputted from the second LED light source LED2 flows to the terminal CH14 of the driver 60. Therefore, the switch Q1 is turned on by the current flowing from the emitter to the base. As a result, a current path for the first mode is formed to bypass the resistor R2 and pass through the switch Q1 and the resistor R3. Therefore, the load voltage is formed by the resistor R3.

In the first mode, the comparison voltage providing section 52 provides the comparison voltage of the first control level, at which the switch T3 can always maintain a turn-on state, to the positive terminal (+) of the comparator 54. The level of the comparison voltage is controlled by the current control signal M3 of the first mode.

Therefore, the comparator 54 maintains an output of a high level since the load voltage applied to the negative terminal (−) is always formed at a level lower than the comparison voltage applied to the positive terminal (+). Thus, the switch T3 maintains a turn-on state by the output of the comparator 54 which has a high level.

Accordingly, in the first mode, the current control unit 50 provides a bypass path which includes the switch T3 and the resistor R3, and the rectified voltage Vin may be transferred to the second light source group by the current control unit 50.

By the above-described operation of the current control unit 50, in the first mode, the first LED light source LED1 of the first light source group and the third LED light source LED3 of the second light source group are connected in parallel with respect to the rectified voltage Vin.

Referring to FIG. 15, in the second mode, the switching circuit CC2 of the driver 60 is turned off by the mode control signal M1.

Namely, in the second mode, no current flows from the second LED light source LED2 to the terminal CH14 of the driver 60. Therefore, the switch Q1 is turned off since current does not flow from the emitter to the base. As a result, in the second mode, the load voltage is formed by the resistors R2 and R3.

In the second mode, after the fourth LED light source LED4 first emits light in correspondence to the rise of the rectified voltage Vin, when the fourth LED light source LED4 and another LED light source (for example, the second LED light source LED2) start to emit light in series, the comparison voltage providing section 52 provides the comparison voltage having the second control level, which is lower than the load voltage provided by the resistors R2 and R3, to the positive terminal (+) of the comparator 54. That is to say, the first period of the second mode may be defined as a period in which the level of the rectified voltage Vin is equal to or lower than a level at which only the fourth LED light source LED4 emits light.

The comparison voltage providing section 52 controls the comparison voltage to have the second control level, by the current control signal M3 in the second mode, and the second control level of the comparison voltage in the second mode is set to be lower than the first control level of the comparison voltage in the first mode.

The comparator 54 maintains an output of a high level during the first period of the second mode in which the load voltage applied to the negative terminal (−) is lower than the comparison voltage applied to the positive terminal (+), and maintains an output of a low level during a period other than the first period of the second mode. Therefore, the switch T3 is turned on during the first period of the second mode, and is turned off during the period other than the first period of the second mode.

Accordingly, the current control unit 50 provides a bypass path which includes the switch T3 and the resistors R2 and R3, during the first period of the second mode, and the rectified voltage Vin may be transferred to the second light source group by the current control unit 50 during the first period of the second mode.

The current control unit 50 controls an amount of current flowing through the switch T3 while providing the bypass path during the first period of the second mode. The amount of current flowing through the switch T3 may be regulated as the load voltage applied to the negative terminal (−) of the comparator 54 is changed according to the change of the rectified voltage Vin.

By the above-described operation of the current control unit 50, during the first period of the second mode, the first LED light source LED1 of the first light source group and the third LED light source LED3 of the second light source group are connected in parallel with respect to the rectified voltage Vin.

Figure 16:
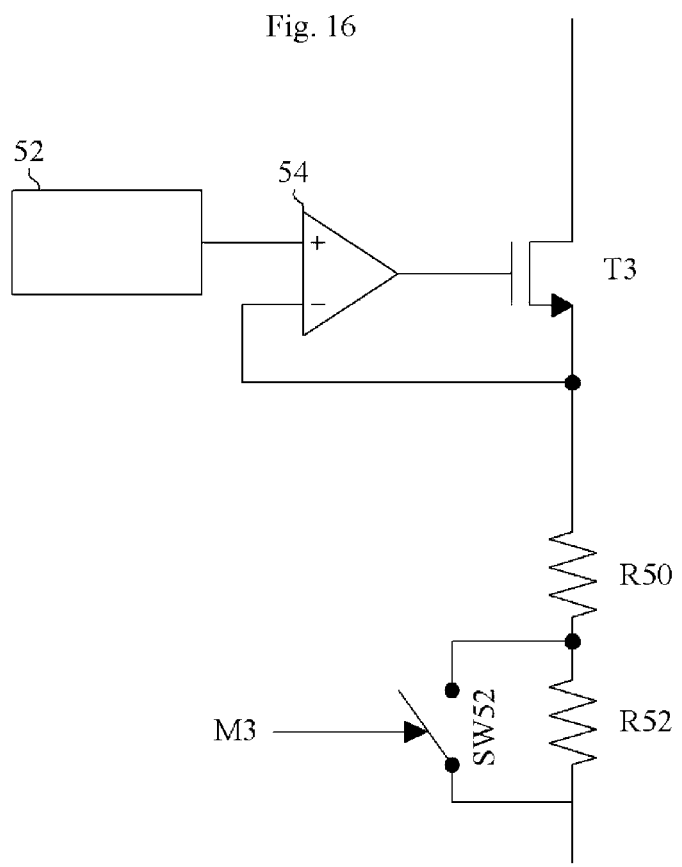
FIG. 16 is a detailed circuit diagram illustrating a current control unit in accordance with another embodiment of the disclosure.

The current control unit 50 may be modified as illustrated in FIG. 16.

The current control unit 50 of FIG. 16 includes the comparison voltage providing section 52 which provides the comparison voltage of a fixed level. The current control unit 50 further includes resistors R50 and R52 which are connected in series at the output side of the switch T3, and a switch SW52 which is connected in parallel to the resistor R52 and is controlled in its switching by the current control signal M3.

By the above-described configuration, the current control unit 50 of FIG. 16 may control the load voltage by the turn-on or turn-off of the switch SW52 depending on a mode.

In the first mode, the switch SW52 is turned on such that the load voltage can maintain a level lower than the comparison voltage.

In the second mode, the switch SW52 is turned on during the first period such that the load voltage has a level lower than the comparison voltage, and is turned off during the period other than the first period such that the load voltage has a level higher than the comparison voltage.

The configurations of the balancing circuits 30 and 40 of FIG. 2 will be described below.

The balancing circuit 30 is configured in parallel with the first LED light source LED1 of the first light source group. The balancing circuit 30 includes a comparison voltage providing section 32, a comparator 34, a switch T1, and a load circuit. The load circuit includes the resistor R1.

The comparison voltage providing section 32 is configured to provide a comparison voltage having a first balancing level higher in the second mode than the first mode in correspondence to the current control signal M4.

The comparator 34 compares a load voltage and the comparison voltage, and provides an output of a level corresponding to a comparison result.

The switch T1 is constituted by an NMOS transistor and is switched by the output of the comparator 34 applied to the gate thereof, and the drain and the source thereof are connected to the rectifier circuit 12 and the resistor R1, respectively.

The resistor R1 as the load circuit is disposed between the first LED light source LED1 and the second LED light source LED2 in the first light source group, is connected to the output terminal of the switch T1, and is configured to provide the load voltage, corresponding to an amount of current, to a negative terminal (−) of the comparator 34. The load voltage is the voltage of a node between the switch T1 and the resistor R1, and a voltage at the output side of the resistor R1 is used as the driving voltage of the comparator 34.

By the above-described configuration, the balancing circuit 30 provides a first balancing path, which includes the switch T1 and the resistor R1, depending on the switching operation of the switch T1 according to the change of the load voltage applied to the resistor R1. In the case where the rectified voltage Vin is lower than the first balancing level, the balancing circuit 30 transfers the rectified voltage Vin to the second LED light source LED2 by bypassing the first LED light source LED1.

In the second mode, the balancing circuit 30 may perform current regulation in the case of providing the first balancing path in correspondence to the change of the rectified voltage Vin, and detailed description thereof will be made later.

The balancing circuit 40 is configured in parallel with the third LED light source LED3 of the second light source group. The balancing circuit 40 includes a comparison voltage providing section 42, a comparator 44, a switch T2, and a load circuit. The load circuit includes the resistor R5.

The comparison voltage providing section 42 is configured to provide a comparison voltage having a first balancing level higher in the second mode than the first mode in correspondence to the current control signal M4.

The comparator 44 compares a load voltage and the comparison voltage, and provides an output of a level corresponding to a comparison result.

The switch T2 is constituted by an NMOS transistor and is switched by the output of the comparator 44 applied to the gate thereof, and the drain and the source thereof are connected to the resistor R3, included in the current control unit 50, and the resistor R5, respectively.

The resistor R5 as the load circuit is disposed between the third LED light source LED3 and the fourth LED light source LED4 in the second light source group, is connected to the output terminal of the switch T2, and is configured to provide the load voltage, corresponding to an amount of current, to a negative terminal (−) of the comparator 44. The load voltage is the voltage of a node between the switch T2 and the resistor R5, and a voltage at the output side of the resistor R5 is used as the driving voltage of the comparator 44.

By the above-described configuration, the balancing circuit 40 provides a second balancing path, which includes the switch T2 and the resistor R5, depending on the switching operation of the switch T2 according to the change of the load voltage applied to the resistor R5. In the case where the rectified voltage Vin is lower than the second balancing level, the balancing circuit 40 transfers the rectified voltage Vin to the fourth LED light source LED4 by bypassing the third LED light source LED3.

In the second mode, the balancing circuit 40 may perform current regulation in the case of providing the second balancing path in correspondence to the change of the rectified voltage Vin, and detailed description thereof will be made later.

The first balancing level and the second balancing level of the balancing circuit 30 and the balancing circuit 40 are equally set in the first mode by the current control signal M4.

In this case, in each of the first light source group and the second light source group, the arrangement state of LED light sources therein is changed to series or parallel.

In the second mode, the second balancing level of the balancing circuit 40 is set higher than the control level of the current control unit 50, and the first balancing level of the balancing circuit 30 is set higher than the second balancing level of the balancing circuit 40. Therefore, in correspondence to a rising period during one cycle of the rectified voltage Vin, the current control unit 50, the balancing circuit 40 and the balancing circuit 30 are sequentially turned off. In corresponding to a falling period during one cycle of the rectified voltage Vin, the balancing circuit 30, the balancing circuit 40 and the current control unit 50 are sequentially turned on.

In the first mode, in correspondence to a rise during one cycle of the rectified voltage Vin, light emission states of LED light sources in the first light source group and the second light source group are changed in the order of parallel light emission and serial light emission.

In the second mode, in correspondence to a rise during one cycle of the rectified voltage Vin, light emission states of the LED light sources are changed in the order of light emission of the fourth LED light source LED4, serial light emission of the second LED light source LED2 and the fourth LED light source LED4, serial light emission of the second LED light source LED2 to the fourth LED light source LED4, and serial light emission of the first LED light source LED1 to the fourth LED light source LED4.

The operation of the embodiment of the disclosure, configured as mentioned above, corresponding to the first mode will be described below with reference to FIGS. 17 to 19.

Figure 17:
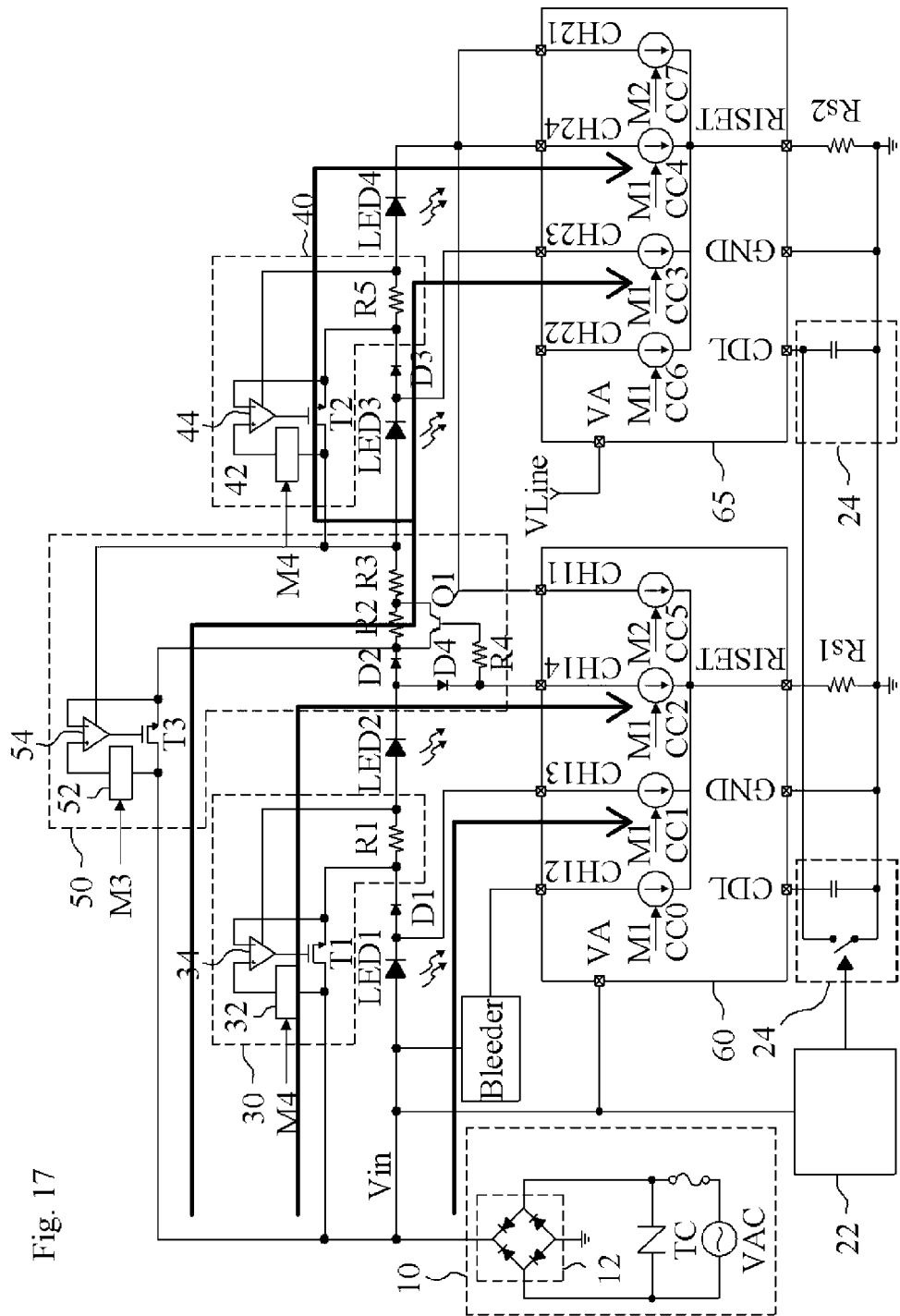
FIGS. 17 and 18 are circuit diagrams to assist in the explanation of the change of a current path depending on the change of a rectified voltage in the first mode.

FIG. 17 illustrates a case in which the LED light sources in the first light source group and the second light source group emit light in parallel in correspondence to the rectified voltage Vin with the rated voltage of 120V in the first mode. FIG. 17 is to assist in the explanation of the operation of the embodiment corresponding to the rectified voltage Vin lower than the first and second balancing levels during the change of the rectified voltage Vin through one cycle, and at this time, the balancing circuits 30 and 40 are in turn-on states.

Figure 18:
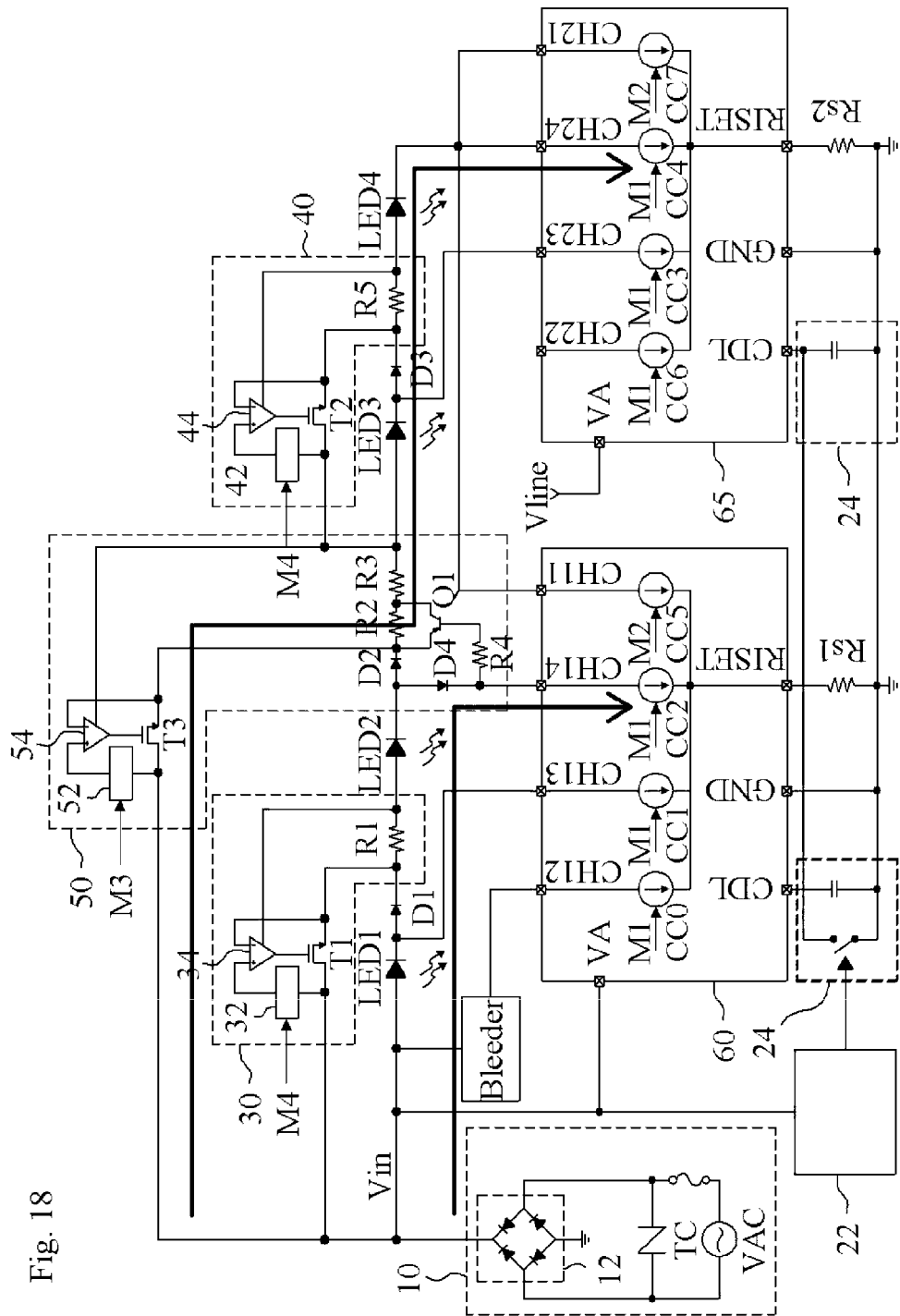

FIG. 18 illustrates a case in which the LED light sources in the first light source group and the second light source group emit light in series in correspondence to the rectified voltage Vin with the rated voltage of 120V. FIG. 18 is to assist in the explanation of the operation of the embodiment corresponding to the rectified voltage Vin equal to or higher than the first and second balancing levels during the change of the rectified voltage Vin through one cycle, and at this time, the balancing circuits 30 and 40 are in turn-off states.

Figure 19:
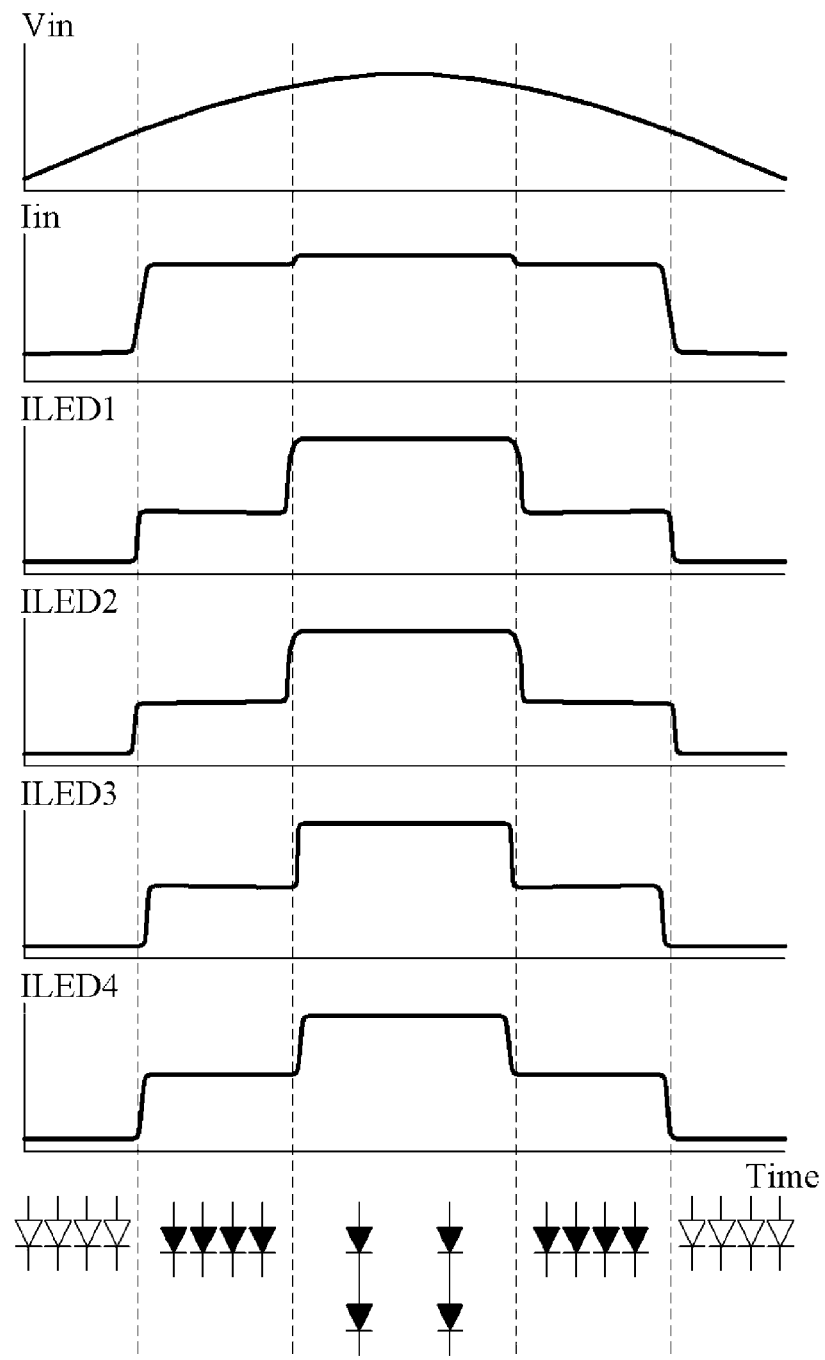
FIG. 19 is a waveform diagram to assist in the explanation of the change of current and the change of a light emitting state in the first mode.

FIG. 19 illustrates a waveform diagram of a voltage and current as the embodiment of the disclosure sequentially operates as illustrated in FIGS. 17 and 18 in correspondence to the rectified voltage Vin through one cycle in a first mode. In FIG. 19, Iin denotes total input current provided to the first and second light source groups, that is, driving current by light emission.

In the first mode of the embodiment of the disclosure to be described with reference to FIGS. 17 to 19, the rectified voltage Vin rises from 0V to a peak value corresponding to the rated voltage of 120V via the first and second balancing levels, and thereafter, falls to 0V via the first and second balancing levels.

In the first mode, since the balancing circuits 30 and 40 have the comparison voltages of the same balancing level, the balancing circuits 30 and 40 may turn on or off the first and second balancing paths at the same time. In addition, the balancing circuits 30 and 40 provide the first and second balancing paths, respectively, by maintaining the turn-on states of the switches T1 and T2 in correspondence to the rectified voltage Vin which forms the load voltages lower than the comparison voltages. Therefore, the balancing circuits 30 and 40 maintain normal turn-on states in correspondence to the initial rectified voltage Vin.

In the first mode, the current control unit 50 has the first control level of the comparison voltage which is always higher than the load voltage by the rectified voltage Vin through one cycle. In the case where light emission is maintained in the first mode, current flow from the second LED light source LED2 to the terminal CH14 of the driver 60 is maintained, and the switch Q1 is turned off. Thus, during the first mode, the current control unit 50 provides the bypass path, which includes the switch T3 and the resistors R2 and R3, by the turn-on of the switch T3 and the turn-off of the switch Q1. Therefore, the current control unit 50 maintains a normal turn-on state in correspondence to the rectified voltage Vin through one cycle.

In the drivers 60 and 65, the switching circuits CC0, CC1, CC2, CC6, CC3 and CC4 maintain turn-on states by the mode control signal M1, and the switching circuits CC5 and CC7 are turned off by the mode control signal M2. The switching circuits CC0, CC1, CC2, CC6, CC3 and CC4 maintain, in correspondence to the initial rectified voltage Vin, normal turn-on states since the reference voltages VREF2 to VREF4 are higher than the sensing voltages which are fed back.

In other words, in correspondence to the initial rectified voltage Vin, the balancing circuits 30 and 40, the current control unit 50 and the switching circuits CC0 to CC7 of the drivers 60 and 65 maintain normal turn-on states.

Thus, in correspondence to the initial rectified voltage Vin, the first LED light source LED1 and the second LED light source LED2 of the first light source group are provided with the rectified voltage Vin directly from the rectifier circuit 12 or via the balancing circuit 30 which is turned on. Also, in correspondence to the initial rectified voltage Vin, the third LED light source LED3 and the fourth LED light source LED4 of the second light source group are provided with the rectified voltage Vin via the current control unit 50 which is turned on or via the current control unit 50 which is turned on and the balancing circuit 40 which is turned on.

As a result, the first light source group and the second light source group are configured in parallel with respect to the rectified voltage Vin by the bypass path of the current control unit 50. The first LED light source LED1 and the second LED light source LED2 of the first light source group are configured in parallel with respect to the rectified voltage Vin by the first balancing path of the balancing circuit 30 which is turned on. The third LED light source LED3 and the fourth LED light source LED4 of the second light source group are configured in parallel with respect to the rectified voltage Vin by the second balancing path of the balancing circuit 40 which is turned on.

Namely, all of the first LED light source LED1 to the fourth LED light source LED4 are provided with the rectified voltage Vin in parallel.

The bleeder 70 provides a discharge path until the rectified voltage Vin rises to a level at which the respective LED light sources, that is, the first LED light source LED1 to the fourth LED light source LED4, emit light. In this case, the discharge path is formed to include the bleeder 70, the switching circuit CC0 of the driver 60 and the sensing resistor Rs1. That is to say, before the first light source group and the second light source group emit light, the bleeder 70 blocks current by the rectified voltage Vin which is low, from being transferred to the first LED light source LED1 to the fourth LED light source LED4.

If the rectified voltage Vin rises to a level at which the respective LED light sources, that is, the first LED light source LED1 to the fourth LED light source LED4, emit light, the first LED light source LED1 to the fourth LED light source LED4, which are connected in parallel with respect to the rectified voltage Vin, emit light at the same time.

In detail, in correspondence to the light emission of the first LED light source LED1, the switching circuit CC1 of the driver 60 provides a current path. In correspondence to the light emission of the second LED light source LED2, the switching circuit CC2 of the driver 60 provides a current path. In correspondence to the light emission of the first LED light source LED1 and the second LED light source LED2, the driving current Iin flows to the sensing resistor Rs1 through the switching circuits CC1 and CC2. The sensing resistor Rs1 provides a sensing voltage corresponding to the increased driving current Iin in correspondence to the risen rectified voltage Vin. The sensing voltage is higher than the reference voltage VREF2 which is applied to the comparator CA12 of the switching circuit CC0. Therefore, the NMOS transistor QS12 is turned off by the output of the comparator CA12, and the switching circuit CC0 is turned off.

Further, in correspondence to the light emission of the third LED light source LED3, the switching circuit CC3 of the driver 65 provides a current path. In correspondence to the light emission of the fourth LED light source LED4, the switching circuit CC4 of the driver 65 provides a current path. In correspondence to the light emission of the third LED light source LED3 and the fourth LED light source LED4, the driving current Iin flows to the sensing resistor Rs2 through the switching circuits CC3 and CC4.

The first LED light source LED1 to the fourth LED light source LED4 start to emit light at the same time in parallel. Therefore, as shown in FIG. 19, currents ILED1 to ILED4 of the respective LED light sources rise at the same time.

As described above, even through the rectified voltage Vin rises after all the first LED light source LED1 to the fourth LED light source LED4 emit light by being connected in parallel, the currents of the respective switching circuits CC1 to CC4 are regulated to maintain constant amounts by the feedback of the sensing voltages of the sensing resistors Rs1 and Rs2.

Thereafter, if the rectified voltage Vin rises to a level at which the first LED light source LED1 and the second LED light source LED2 of the first light source group may emit light in series, the voltage applied to the resistor R1 of the balancing circuit 30, that is, the load voltage, rises above the first balancing level of the comparison voltage. If the load voltage rises above the comparison voltage, the switch T1 is turned off by the output of the comparator 34. In other words, the balancing circuit 30 is turned off and does not provide the first balancing path which transfers the rectified voltage Vin to the second LED light source LED2.

Therefore, the rectified voltage Vin is applied to both ends of the first LED light source LED1 and the second LED light source LED2 of the first light source group, which are connected in series.

At this time, the rectified voltage Vin is in a state in which it has risen to a level at which the first LED light source LED1 and the second LED light source LED2 of the first light source group may emit light in series. Thus, the first LED light source LED1 and the second LED light source LED2 emit light in series, and a current path for the light emission is provided by the switching circuit CC2. The sensing resistor Rs1 provides a sensing voltage corresponding to the increased driving current Iin in correspondence to the risen rectified voltage Vin. The sensing voltage is higher than the reference voltage VREF3 which is applied to the comparator CA13 of the switching circuit CC1. Therefore, the NMOS transistor QS13 is turned off by the output of the comparator CA13, and the switching circuit CC1 is turned off.

The balancing circuit 40 is also turned off in the same manner as the balancing circuit 30 and does not provide the second balancing path which transfers the rectified voltage Vin to the fourth LED light source LED4.

In detail, if the rectified voltage Vin rises to a level at which the third LED light source LED3 and the fourth LED light source LED4 of the second light source group may emit light in series, the voltage applied to the resistor R5 of the balancing circuit 40, that is, the load voltage, rises above the second balancing level of the comparison voltage. If the load voltage rises above the comparison voltage, the switch T2 is turned off by the output of the comparator 44. In other words, the balancing circuit 40 is turned off and does not provide the second balancing path which transfers the rectified voltage Vin to the fourth LED light source LED4.

Therefore, the rectified voltage Vin is applied to both ends of the third LED light source LED3 and the fourth LED light source LED4 of the second light source group, which are connected in series.

At this time, the rectified voltage Vin is in a state in which it has risen to a level at which the third LED light source LED3 and the fourth LED light source LED4 of the second light source group may emit light in series. Thus, the third LED light source LED3 and the fourth LED light source LED4 emit light in series, and a current path for the light emission is provided by the switching circuit CC4. The sensing resistor Rs2 provides a sensing voltage corresponding to the increased driving current Iin in correspondence to the risen rectified voltage Vin. The sensing voltage is higher than the reference voltage VREF3 which is applied to the comparator CA23 of the switching circuit CC3. Therefore, the NMOS transistor QS23 is turned off by the output of the comparator CA23, and the switching circuit CC3 is turned off.

The turn-off of the first and second balancing paths of the balancing circuits 30 and 40 occurs at the same time, and the serial light emission of the first LED light source LED1 and the second LED light source LED2 and the serial light emission of the third LED light source LED3 and the fourth LED light source LED4 starts at the same time. Therefore, as shown in FIG. 19, the currents ILED1 to ILED4 of the respective LED light sources further increase at the same time in correspondence to the risen level of the rectified voltage Vin.

As described above, even if the rectified voltage Vin rises to the peak level while the serial light emission is maintained and then falls, the currents of the respective switching circuits CC1 to CC4 are regulated to maintain constant amounts by the feedback of the sensing voltages of the sensing resistors Rs1 and Rs2.

If the rectified voltage Vin gradually falls from the peak level, the light emission state of the embodiment is changed from the serial light emission of FIG. 18 to the parallel light emission of FIG. 17, and accordingly, driving current also decreases in a stepwise manner. If the rectified voltage Vin falls to 0V, the first and second light source groups are extinguished.

In the above-described process, timings for the turn-off and turn-on of the balancing circuits 30 and 40 may be set such that the first light source group and the second light source group may consume the same current at the time of serial light emission and parallel light emission. The timings for the turn-off and turn-on of the balancing circuits 30 and 40 may be adjusted by setting the balancing levels of the comparison voltages. Thus, in the embodiment of the disclosure, uniform dimming is possible even when a light emission state is changed.

The operation of the embodiment of the disclosure corresponding to the second mode will be described below with reference to FIGS. 20 to 24.

FIGS. 20 to 23 illustrate a case in which the first LED light source LED1 to the fourth LED light source LED4 of the first light source group and the second light source group sequentially emit light in correspondence to the rectified voltage Vin with the rated voltage of 277V in the second mode. FIG. 24 is a waveform diagram to assist in the explanation of a voltage and current in accordance with the embodiment as a light emission state is changed as illustrated in FIGS. 20 to 23.

In the second mode, the rectified voltage Vin rises from 0V to the peak level corresponding to the rated voltage of 277V via the second control level of the comparison voltage of the current control unit 50, the second balancing level of the comparison voltage of the balancing circuit 40 and the first balancing level of the comparison voltage of the balancing circuit 30, and then, falls to 0V via the first balancing level, the second balancing level and the second control level.

In the second mode, the comparison voltage of the balancing circuit 40 has the second balancing level lower than the first balancing level of the comparison voltage of the balancing circuit 30, and the comparison voltage of the current control unit 50 has the second control level lower than the second balancing level of the comparison voltage of the balancing circuit 40.

The second control level is set such that the current control unit 50 is turned off when the rectified voltage Vin rises above a level at which two LED light sources emit light in series, the second balancing level is set such that the balancing circuit 40 is turned off when the rectified voltage Vin rises above a level at which three LED light sources emit light in series, and the first balancing level is set such that the balancing circuit 30 is turned off when the rectified voltage Vin rises above a level at which four LED light sources emit light in series.

In the same manner as in the first mode, the balancing circuits 30 and 40 and the current control unit 50 maintain normal turn-on states in correspondence to the initial rectified voltage Vin.

In the drivers 60 and 65, the switching circuits CC0, CC1, CC2, CC6, CC3 and CC4 are turned off by the mode control signal M1, and the switching circuits CC5 and CC7 maintain turn-on states by the mode control signal M2. The switching circuits CC5 and CC7 maintain, in correspondence to the initial rectified voltage Vin, normal turn-on states since the reference voltage VREF1 is higher than the sensing voltages which are fed back. The switching circuits CC5 and CC7 are configured to maintain the turn-on states even through the rectified voltage Vin rises to the peak level.

In other words, in the second mode, a current path by the switching circuits CC5 and CC7 is provided to only the fourth LED light source LED4 among the LED light sources of the first light source group and the second light source group.

In the second mode, the current control unit 50 maintains a normal turn-on state during the first period. The first period may be understood as a period in which the rectified voltage Vin is maintained below the second control level. In the second mode, since current flow from the second LED light source LED2 to the terminal CH14 of the driver 60 is not formed, the switch Q1 is turned on. Thus, during the first period of the second mode, the current control unit 50 provides the bypass path which includes the switch T3 and the resistor R3, by the turn-on of the switch T3 and the turn-on of the switch Q1.

By the above description, in the embodiment of the disclosure, no current path is formed in the second mode until the rectified voltage Vin rises to a level at which one LED light source emits light.

Figure 20:
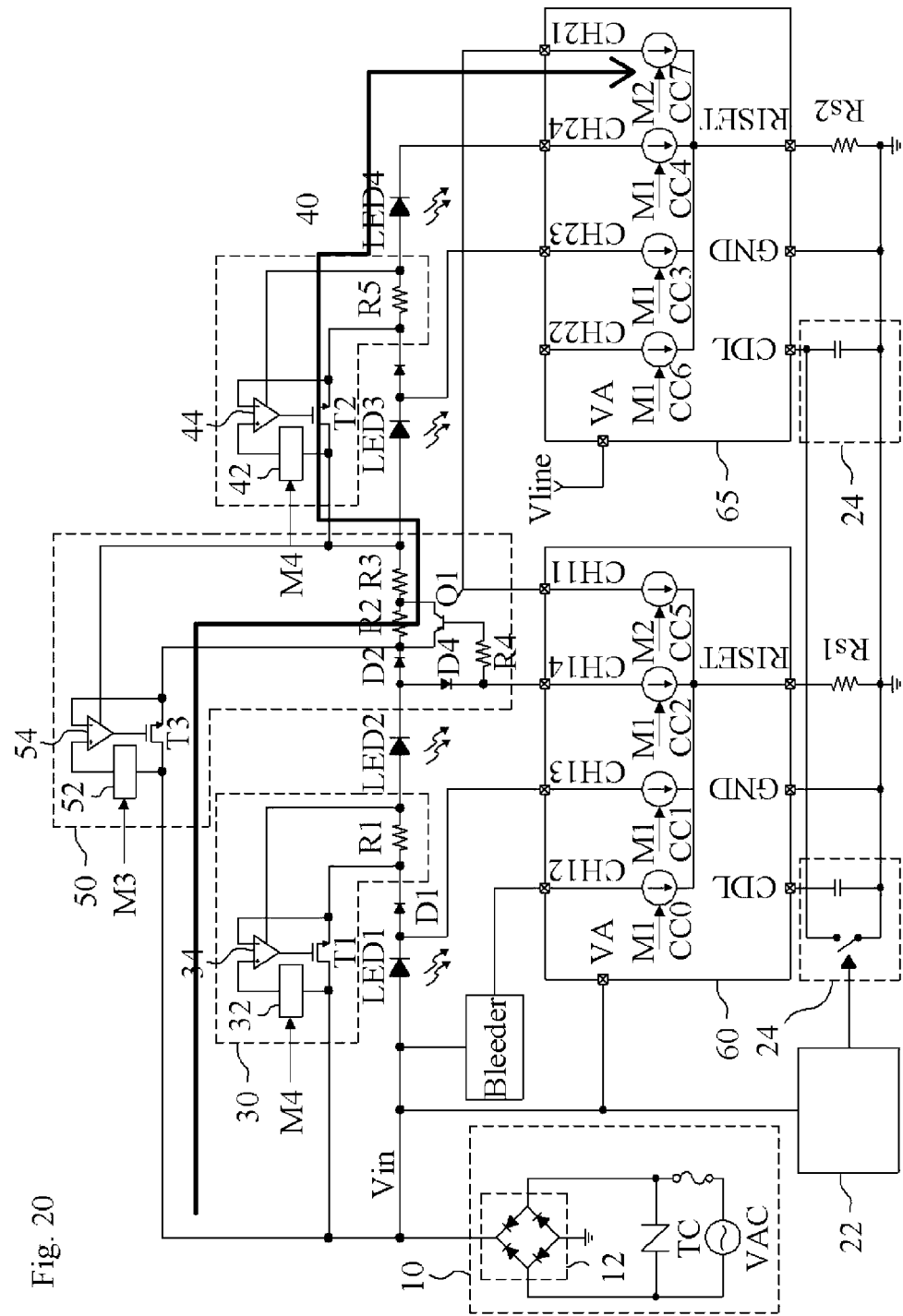
FIGS. 20 to 23 are circuit diagrams to assist in the explanation of the change of a current path depending on the change of a rectified voltage in the second mode.

If the rectified voltage Vin rises to a level at which one LED light source emits light, the fourth LED light source LED4 emits light by the rectified voltage Vin which is applied via the normally turned-on current control unit 50 and the normally turned-on balancing circuit 40 as illustrated in FIG. 20.

When the fourth LED light source LED4 emits light, the switching circuits CC5 and CC7 of the drivers 60 and 65 provide current paths. Driving current flows through the current paths by the switching circuits CC5 and CC7 of the drivers 60 and 65.

In the case where the rectified voltage Vin rises in a state in which the fourth LED light source LED4 emits light, current regulation is performed by the current control unit 50. In detail, when the load voltage applied to the resistor R3 rises according to the rise of the rectified voltage Vin, the current control unit 50 controls an amount of current flowing through the switch T3, by the output of the comparator 54. In the second mode, the current control unit 50 may perform the above-described current regulation as it has a load larger than the drivers 60 and 65.

Figure 21:
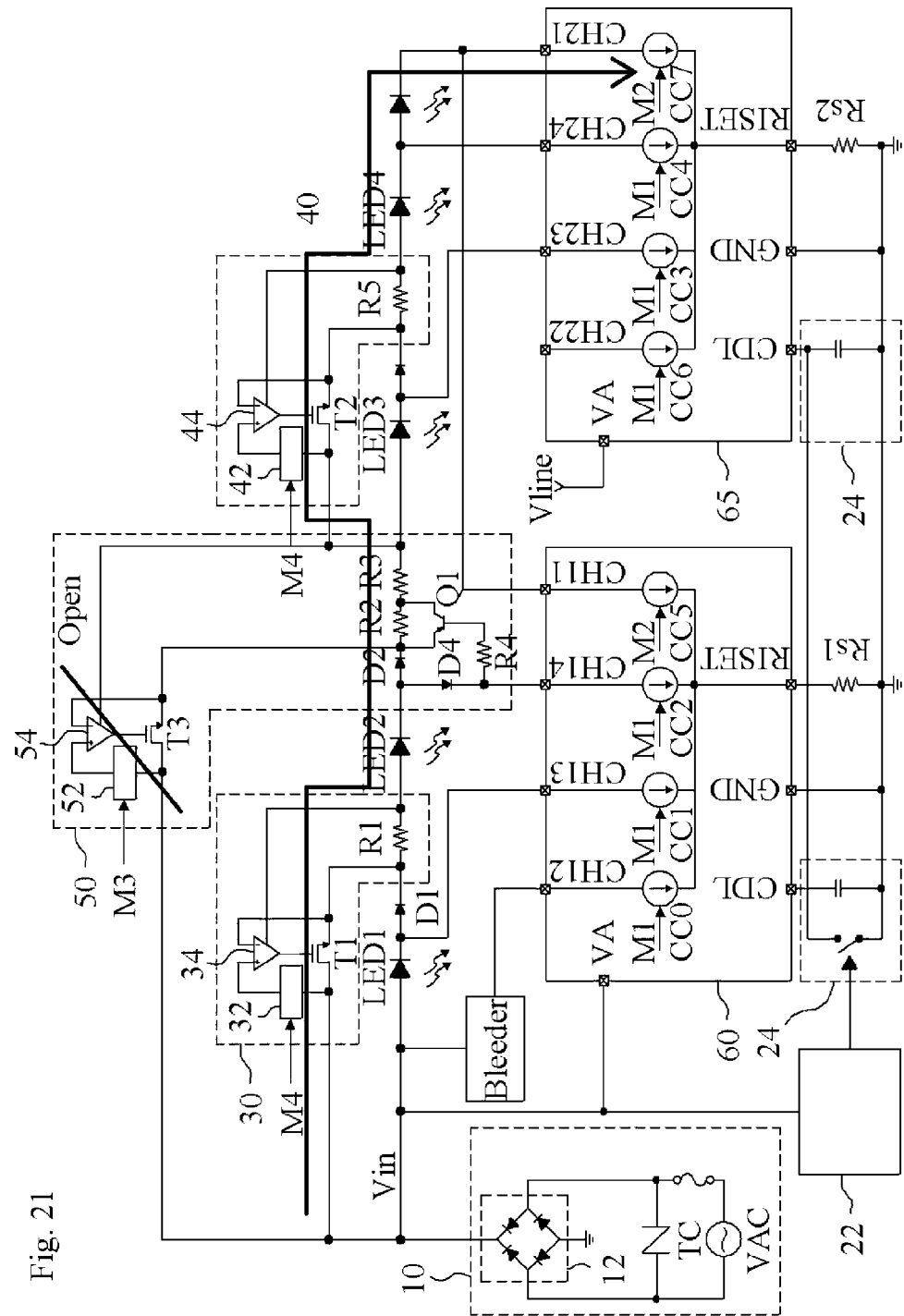

Thereafter, when the rectified voltage Vin rises to a level at which two LED light sources connected in series emit light, the current control unit 50 is turned off as illustrated in FIG. 21. In detail, the load voltage applied to the resistor R3 rises by the risen voltage of the rectified voltage Vin. If the load voltage is equal to or higher than the second control level of the comparison voltage, the switch T3 is turned off by the output of the comparator 54. Namely, the providing of the bypass path by the current control unit 50 is stopped.

As a result, the rectified voltage Vin is transferred through the balancing circuit 30. As a result, since the balancing circuits 30 and 40 maintain the normal turn-on states, the second LED light source LED2 and the fourth LED light source LED4 are connected in series. The second LED light source LED2 and the fourth LED light source LED4 which are connected in series as described above emit light by a voltage at both ends.

At this time, current paths are provided by the switching circuits CC5 and CC7 of the drivers 60 and 65 which are connected to the fourth LED light source LED4.

In the case where the rectified voltage Vin rises in a state in which the second LED light source LED2 and the fourth LED light source LED4 emit light in series, current regulation is performed by the balancing circuit 40. In detail, when the load voltage applied to the resistor R5 rises according to the rise of the rectified voltage Vin, the balancing circuit 40 controls an amount of current flowing through the switch T2, by the output of the comparator 44.

In the second mode, the balancing circuit 40 may perform the above-described current regulation as it has a load larger than the drivers 60 and 65.

Figure 22:
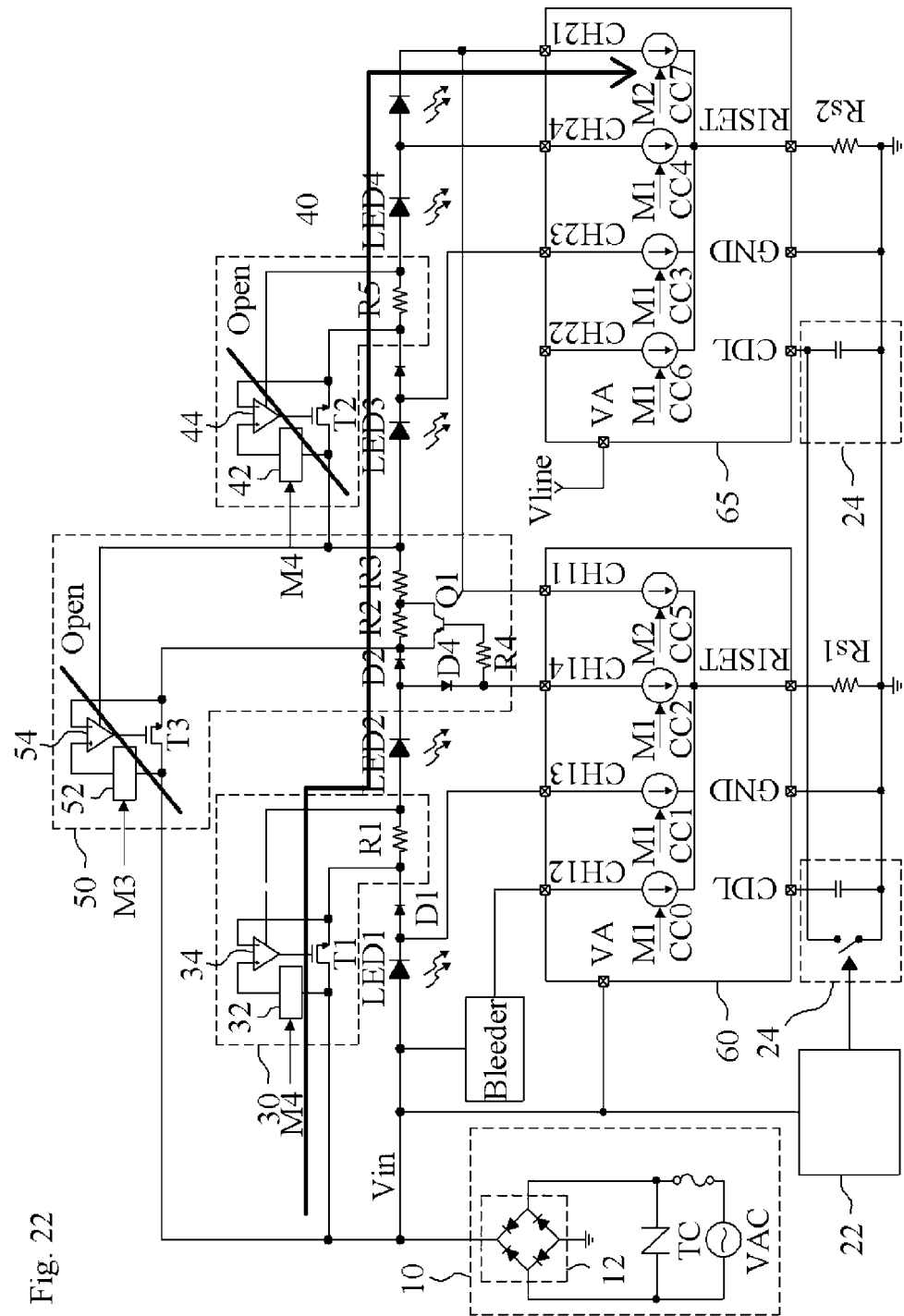

Thereafter, when the rectified voltage Vin rises to a level at which three LED light sources connected in series emit light, the balancing circuit 40 is turned off as illustrated in FIG. 22. At this time, the current control unit 50 maintains a turn-off state. In detail, the load voltage applied to the resistor R5 rises by the risen voltage of the rectified voltage Vin. If the load voltage is equal to or higher than the second balancing level of the comparison voltage, the switch T2 is turned off by the output of the comparator 44. Namely, the providing of the second balancing path by the balancing circuit 40 is stopped.

As a result, the rectified voltage Vin is transferred to the second LED light source LED2 through the balancing circuit 30 which maintains a normal turn-on state, and the second LED light source LED2 to the fourth LED light source LED4 are connected in series. The second LED light source LED2 to the fourth LED light source LED4 which are connected in series as described above emit light by a voltage at both ends.

At this time, current paths are provided by the switching circuits CC5 and CC7 of the drivers 60 and 65 which are connected to the fourth LED light source LED4.

In the case where the rectified voltage Vin rises in a state in which the second LED light source LED2 to the fourth LED light source LED4 emit light in series, current regulation is performed by the balancing circuit 30. In detail, when the load voltage applied to the resistor R1 rises according to the rise of the rectified voltage Vin, the balancing circuit 30 controls an amount of current flowing through the switch T1, by the output of the comparator 34. In the second mode, the balancing circuit 30 may perform the above-described current regulation as it has a load larger than the drivers 60 and 65.

Figure 23:
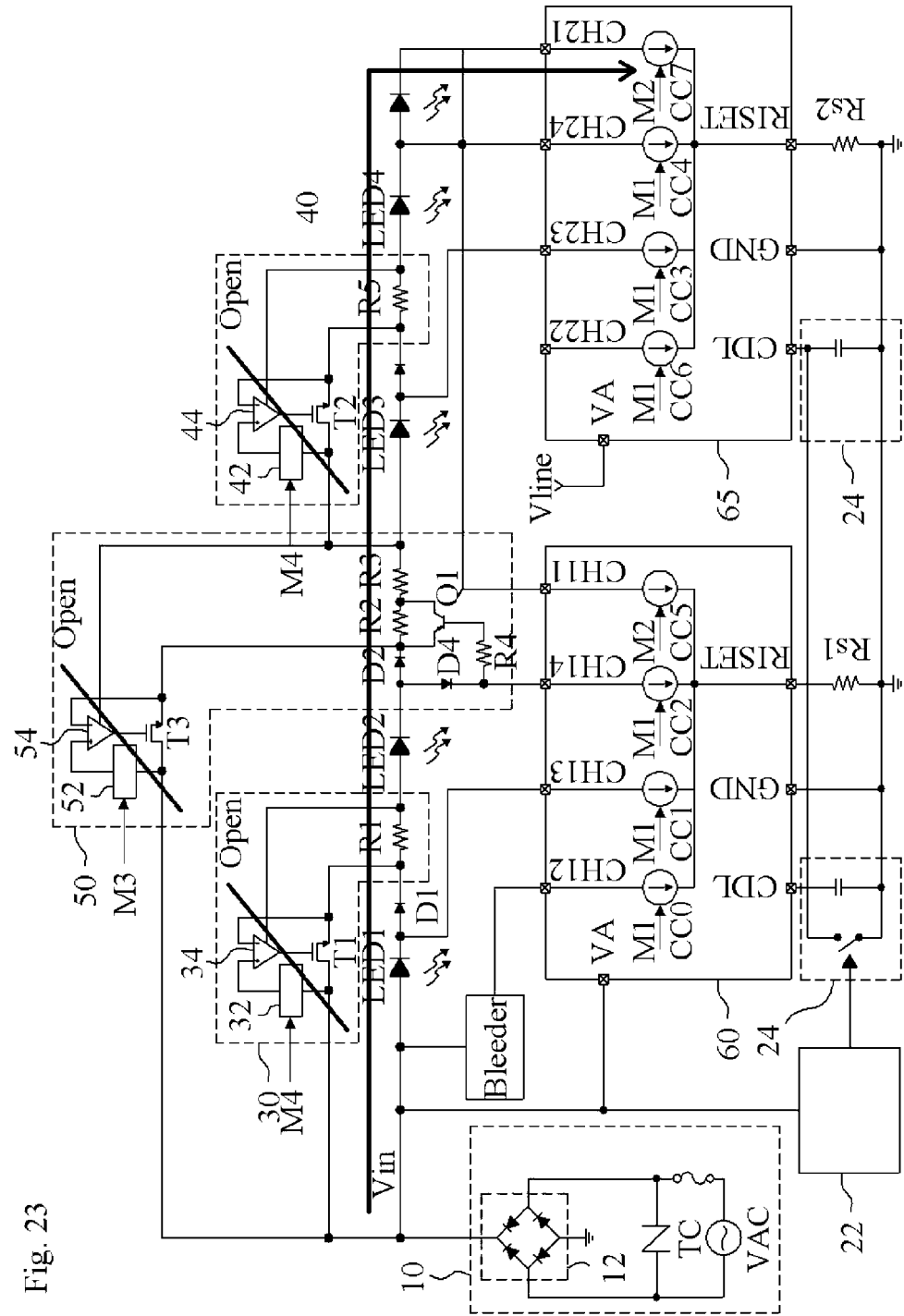
Figure 24:
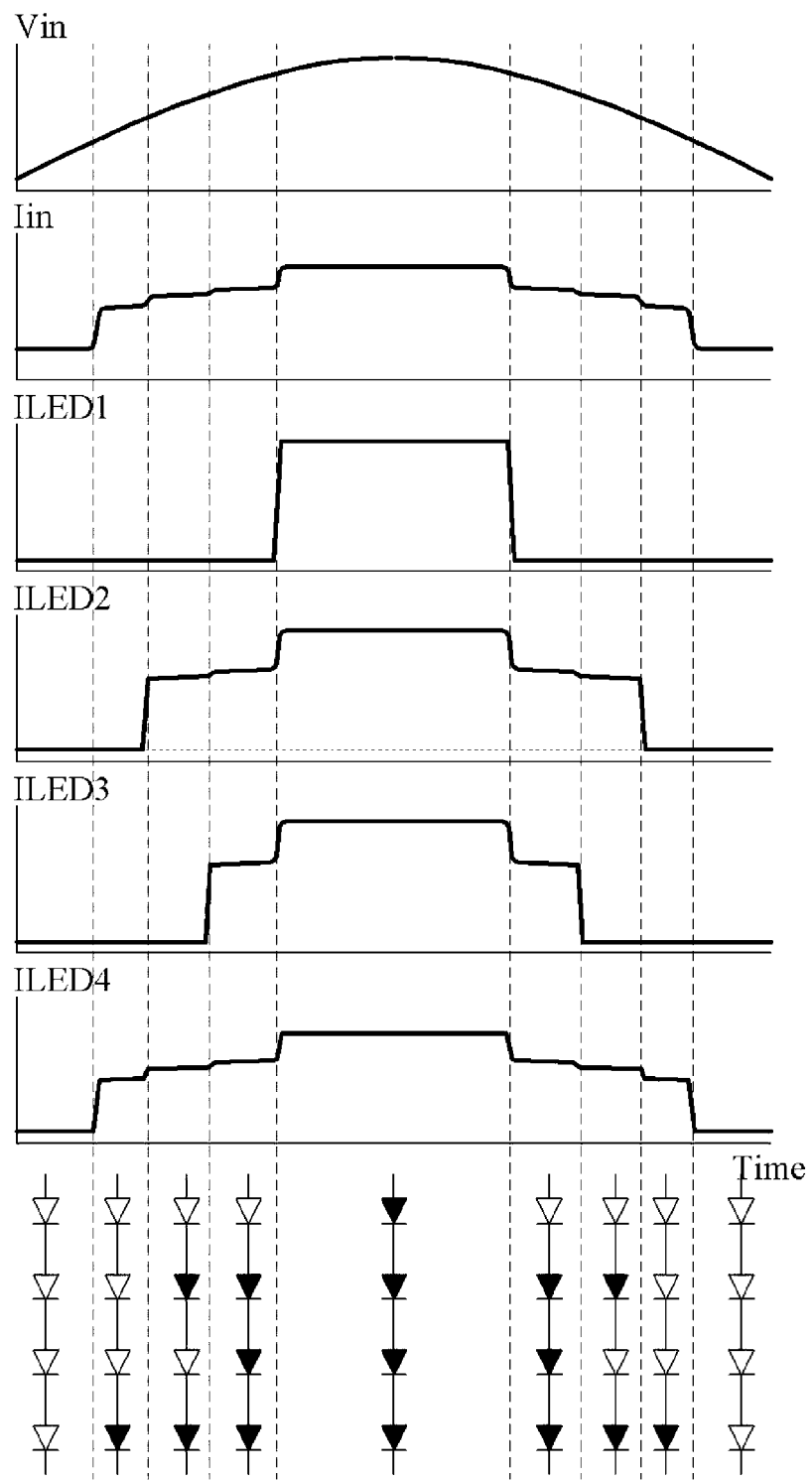
FIG. 24 is a waveform diagram to assist in the explanation of the change of current and the change of a light emitting state in the second mode.

Thereafter, when the rectified voltage Vin rises to a level at which four LED light sources connected in series emit light, the balancing circuit 30 is turned off as illustrated in FIG. 23. At this time, the balancing circuit 40 and the current control unit 50 maintain turn-off states. In detail, the load voltage applied to the resistor R1 rises by the risen voltage of the rectified voltage Vin. If the load voltage is equal to or higher than the first balancing level of the comparison voltage, the switch T1 is turned off by the output of the comparator 34. Namely, the providing of the first balancing path by the balancing circuit 30 is stopped.

As a result, the rectified voltage Vin is directly applied to the first LED light source LED1, and the first LED light source LED1 to the fourth LED light source LED4 are connected in series. The first LED light source LED1 to the fourth LED light source LED4 which are connected in series as described above emit light by a voltage at both ends.

At this time, current paths are provided by the switching circuits CC5 and CC7 of the drivers 60 and 65 which are connected to the fourth LED light source LED4.

In the case where the rectified voltage Vin rises in a state in which the first LED light source LED1 to the fourth LED light source LED4 emit light in series, current regulation is performed by the switching circuits CC5 and CC7 of the drivers 60 and 65. In detail, when the sensing voltages applied to the sensing resistors Rs1 and Rs2 rise as the rectified voltage Vin rises, the switching circuits CC5 and CC7 of the drivers 60 and 65 control amounts of current flowing through the NMOS transistors QS11 and QS21, by the outputs of the comparators CA11 and CA21.

When the rectified voltage Vin gradually falls after reaching the peak level, the light emission state of the embodiment is changed from the light emission state of FIG. 23 to the light emission states of FIGS. 22, 21 and 20 and is then extinguished, and accordingly, the driving current decreases.

As illustrated in FIGS. 20 to 23, the currents ILED1 to ILED4 flowing through the LED light sources and the driving current Iin also gradually increase and then decrease in correspondence to the change of the rectified voltage Vin through one cycle.

Figure 25:
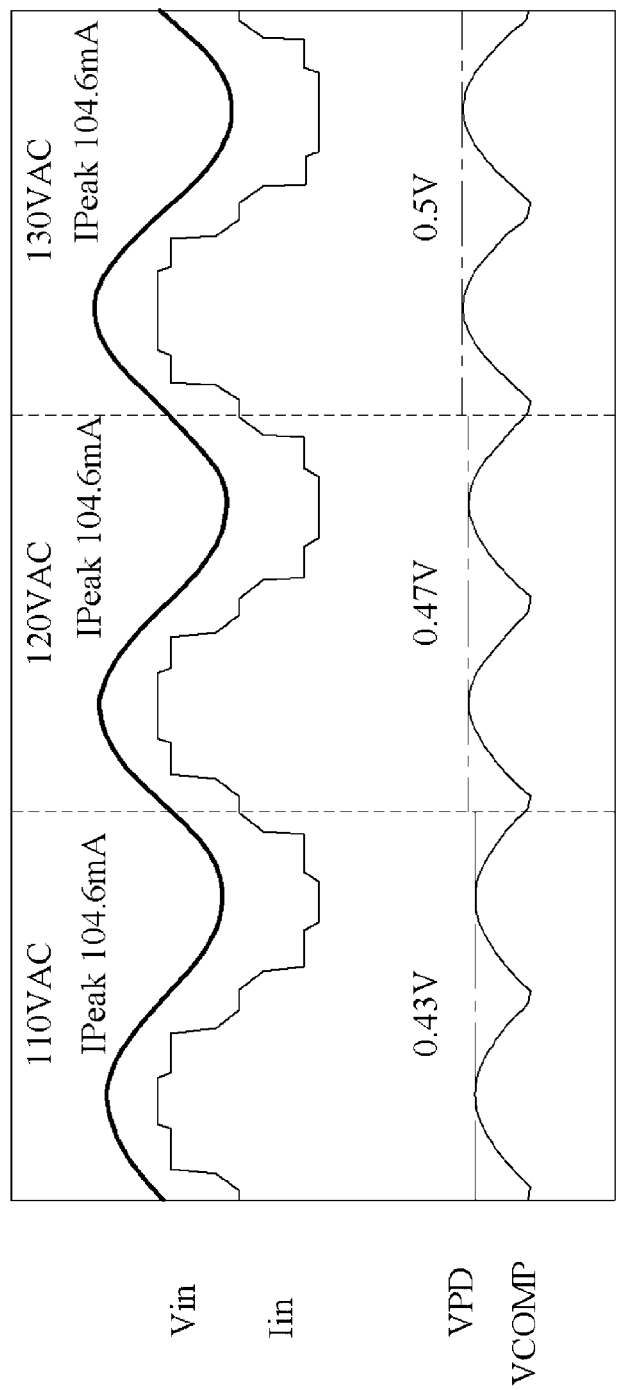
FIG. 25 is a waveform diagram to assist in the explanation of an operation by current regulation in the first mode.
Figure 26:
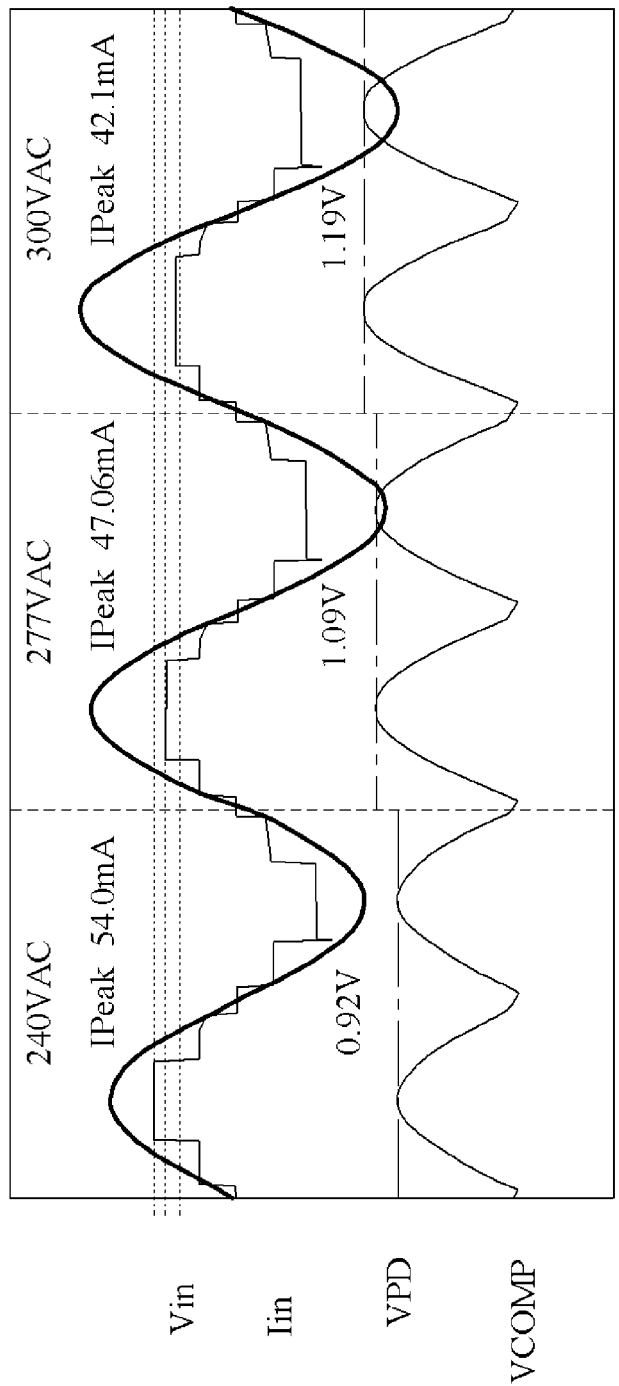
FIG. 26 is a waveform diagram to assist in the explanation of an operation by power regulation in the second mode.

The embodiment of the disclosure performs, in the first mode, an operation by the current regulation as shown in FIG. 25, and performs, in the second mode, an operation by the power regulation as shown in FIG. 26.

To this end, the power compensating section 28 may be configured to be deactivated in the first mode and be activated in the second mode.

In detail, the embodiment of the disclosure regulates the driving current Iin according to light emission by current regulation in the first mode. For instance, as shown in FIG. 25, even if the peak voltage VPD is changed as a rated voltage is changed to 110 VAC, 120 VAC and 130 VAC, the embodiment of the disclosure is controlled to maintain a uniform amount of current regardless of the change of the rectified voltage Vin according to the change of the rated voltage.

The embodiment of the disclosure controls the driving current Iin according to light emission by power regulation in the second mode. For instance, as shown in FIG. 26, when the peak voltage VPD is changed as a rated voltage is changed to 240 VAC, 277 VAC and 300 VAC, the embodiment of the disclosure raises the reference voltage VREF4 according to the rise of the peak voltage VPD as described above with reference to FIG. 7. As a result, the embodiment of the disclosure controls the driving current Iin such that an amount of current decreases in inverse proportion to the change of the peak voltage VPD. Therefore, power regulation of uniformly maintaining power is performed as an amount of driving current is controlled even if a rated voltage is changed in the second mode.

As is apparent from the above description, the embodiments of the disclosure can emit light in a dual mode in correspondence to rectified voltages with different peak levels, thereby supporting various voltage environments.

Also, the embodiments of the disclosure can perform current regulation and uniform dimming in the case of emitting light by a rectified voltage with a low peak level. In addition, the embodiments of the disclosure can perform power regulation in the case of emitting light by a rectified voltage with a high peak level. Therefore, the LED lighting apparatus according to the embodiments of the disclosure may operate with uniform power.

Further, according to the embodiments of the disclosure, the LED lighting apparatus may provide a bleeding function in the case of emitting light by a low rectified voltage, thereby performing a stable operation in consideration of the operation characteristic of a dimmer.

Moreover, according to the embodiments of the disclosure, the LED lighting apparatus may control the change of a driving current by light emission to correspond to the change of a rectified voltage, thereby reducing a total harmonic distortion (THD) phenomenon.

The invention claimed is:

1. An LED lighting apparatus comprising:
a first LED light source and a second LED light source included in a first light source group;

a third LED light source and a fourth LED light source included in a second light source group;

a mode determination unit configured to determine a first mode and a second mode depending on a peak level of a rectified voltage and provide a mode control signal and a current control signal corresponding to a mode, the rectified voltage of the second mode having the peak level higher than the rectified voltage the first mode;

a current control unit configured to transfer, by the current control signal, the rectified voltage to the second light source group by bypassing the first light source group, during a first period in which the rectified voltage is lower than a preset control level;

a first balancing circuit configured to be set in a first balancing level to a different level depending on a mode by the current control signal, and transfer the rectified voltage to the second LED light source by bypassing the first LED light source in the case where the rectified voltage is lower than the first balancing level;

a second balancing circuit configured to be set in a second balancing level to a different level depending on a mode by the current control signal, and transfer the rectified voltage to the fourth LED light source by bypassing the third LED light source in the case where the rectified voltage is lower than the second balancing level; and a current path providing circuit configured to provide a first current path to the first LED light source to the fourth LED light source in correspondence to the mode control signal in the first mode, where the first current path is changed in correspondence to light emission of each of the first light source group and the second light source group in which arrangement states of LED light sources therein are changed to series or parallel in correspondence to change of the rectified voltage through one cycle according to turn-on and turn-off of the first balancing circuit and the second balancing circuit, and provide a second current path to the fourth LED light source in correspondence to the mode control signal in the second mode, wherein the second current path corresponds to light emission of the first LED light source to the fourth LED light source whose serial connection state is changed in correspondence to change of the rectified voltage through one cycle according to sequential turn-off and turn-on of the current control unit, the second balancing circuit and the first balancing circuit.

2. The LED lighting apparatus of claim 1,
wherein, in the first mode, as the first balancing level and the second balancing level are equally set by the current control signal, an arrangement state of LED light sources in each light source group is changed to series or parallel by turn-off and turn-on of the first balancing circuit and the second balancing circuit in correspondence to change of the rectified voltage through one cycle, and wherein, in the second mode, as, by the current control signal, the second balancing level is set higher than the control level and the first balancing level is set higher than the second balancing level, the current control unit, the second balancing circuit and the first balancing circuit are sequentially turned off in correspondence to a rising period during one cycle of the rectified voltage.

3. The LED lighting apparatus of claim 2,
wherein, in the first mode, in correspondence to a rise of the rectified voltage during one cycle, a light emission state of LED light sources in the first light source group and the second light source group is changed in the order of parallel light emission and serial light emission, and wherein, in the second mode, in correspondence to a rise of the rectified voltage during one cycle, a light emission state of LED light sources is changed in the order of light emission of the fourth LED light source, serial light emission of the second LED light source and the fourth LED light source, serial light emission of the second LED light source to the fourth LED light source, and serial light emission of the first LED light source to the fourth LED light source.

4. The LED lighting apparatus of claim 1,
wherein, in the first mode, the current path providing circuit performs turn-on of the first current path and turn-off of the second current path in correspondence to the mode control signal, and performs current regulation on the first current path by comparing reference voltages corresponding to the first to fourth LED light sources and a sensing voltage obtained by feeding back driving current corresponding to light emission, and wherein, in the second mode, the current path providing circuit performs turn-off of the first current path and turn-on of the second current path in correspondence to the mode control signal, and performs power regulation by controlling an amount of current of the second current path in correspondence to the peak level of the rectified voltage.

5. The LED lighting apparatus of claim 4, wherein the mode determination unit comprises a power compensating section which generates a power compensation signal corresponding to the peak level and provides the power compensation signal to the current path providing circuit for the power regulation.

6. The LED lighting apparatus of claim 5, wherein the current path providing circuit changes, by the power compensation signal, reference voltages corresponding to the second current path to correspond to a rise and a fall of the peak level, and controls an amount of current of the second current path by comparing the changed reference voltages and a sensing voltage obtained by feeding back the driving current corresponding to light emission.

7. The LED lighting apparatus of claim 1, wherein the mode determination unit comprises:

a voltage sensing section configured to provide a peak voltage corresponding to the peak level of the rectified voltage;

a mode detecting section configured to provide a mode detection signal which has a different level in each mode depending on the peak voltage; and a mode control section configured to provide the mode control signal and the current control signal corresponding to a mode by the mode detection signal.

8. The LED lighting apparatus of claim 1,
wherein the current control unit turns on a first bypass path which transfers the rectified voltage to the second light source group by bypassing the first light source group, in correspondence to the current control signal during an entire period of the first mode, and wherein the current control unit turns on a second bypass path which transfers the rectified voltage to the second light source group by bypassing the first light source group, during the first period of the second mode, and turns off the second bypass path during a period other than the first period of the second mode.

9. The LED lighting apparatus of claim 1, wherein the current control unit comprises:

a comparison voltage providing section configured to provide, in correspondence to the current control signal, a comparison voltage which has a first control level in the first mode and a second control level lower than the first control level in the second mode;

a comparator configured to compare a load voltage and the comparison voltage;

a first switch configured to selectively transfer the rectified voltage by an output of the comparator;

a second switch configured to be turned on in the first mode and be turned off in the second mode; and a load circuit including a first resistor and a second resistor which are connected in series between the first light source group and the second light source group, the first resistor being connected to an output terminal of the first switch and the first light source group and being configured in parallel with the second switch, and configured to provide the load voltage corresponding to an amount of current, wherein a first bypass path which includes the first switch, the second switch and the second resistor is provided in correspondence to the first mode, and a second bypass path which includes the first switch, the first resistor and the second resistor is provided in correspondence to the first period of the second mode.

10. The LED lighting apparatus of claim 1, wherein each of the first balancing circuit and the second balancing circuit comprises:

a comparison voltage providing section configured to provide a comparison voltage which has a balancing level higher in the second mode than the first mode, in correspondence to the current control signal;

a comparator configured to compare a load voltage and the comparison voltage;

a switch configured to be controlled in switching by an output of the comparator; and a load circuit disposed between LED light sources in each light source group, connected to an output terminal of the switch, and configured to provide the load voltage corresponding to an amount of current, wherein a balancing path which includes the switch and the load circuit is provided depending on an operation of the switch according to change of the load voltage.

11. An LED lighting apparatus comprising:

a first LED light source and a second LED light source included in a first light source group;

a third LED light source and a fourth LED light source included in a second light source group;

a mode detection circuit configured to provide a mode detection signal which has a different level in each mode, by using a peak voltage which follows a peak level of a rectified voltage;

a current control unit configured to transfer, by a current control signal, the rectified voltage to the second light source group by bypassing the first light source group, during a first period in which the rectified voltage is lower than a preset control level;

a first balancing circuit configured to be set in a first balancing level to a different level depending on a mode by the current control signal, and transfer the rectified voltage to the second LED light source by bypassing the first LED light source in the case where the rectified voltage is lower than the rectified voltage the first balancing level;

a second balancing circuit configured to be set in a second balancing level to a different level depending on a mode by the current control signal, and transfer the rectified voltage to the fourth LED light source by bypassing the third LED light source in the case where the rectified voltage is lower than the second balancing level;

a first driver configured to provide a first current path corresponding to serial or parallel connection of the first LED light source and the second LED light source in a first mode; and a second driver configured to provide a second current path corresponding to serial or parallel connection of the third LED light source and the fourth LED light source in the first mode, and provide a third current path to the fourth LED light source in a second mode in which a peak level of the rectified voltage is higher than the first mode, wherein at least one of the first driver and the second driver provides the current control signal which has a different level in each mode, in correspondence to the mode detection signal.

12. The LED lighting apparatus of claim 11, wherein, in the first mode, as the first balancing level and the second balancing level are equally set by the current control signal, an arrangement state of LED light sources in each light source group is changed to series or parallel by turn-off and turn-on of the first balancing circuit and the second balancing circuit in correspondence to change of the rectified voltage through one cycle, and wherein, in the second mode, as, by the current control signal, the second balancing level is set higher than the control level and the first balancing level is set higher than the second balancing level, the current control unit, the second balancing circuit and the first balancing circuit are sequentially turned off in correspondence to a rising period during one cycle of the rectified voltage.

13. The LED lighting apparatus of claim 12, wherein, in the first mode, in correspondence to a rise of the rectified voltage during one cycle, a light emission state of LED light sources in the first light source group and the second light source group is changed in the order of parallel light emission and serial light emission, and wherein, in the second mode, in correspondence to a rise of the rectified voltage during one cycle, a light emission state of LED light sources is changed in the order of light emission of the fourth LED light source, serial light emission of the second LED light source and the fourth LED light source, serial light emission of the second LED light source to the fourth LED light source, and serial light emission of the first LED light source to the fourth LED light source.

14. The LED lighting apparatus of claim 11, wherein the first driver and the second driver include a mode control section which generates a mode control signal having a different level in each mode in correspondence to the mode detection signal, perform turn-on of the first current path and the second current path and turn-off of the third current path in correspondence to the mode control signal in the first mode, and perform current regulation on the first current path and the second current path by comparing reference voltages corresponding to the first to fourth LED light sources and a sensing voltage obtained by feeding back driving current corresponding to light emission, wherein the first driver and the second driver perform turn-off of the first current path and the second current path and turn-on of the third current path in correspondence to the mode control signal in the second mode, and wherein the second driver performs power regulation by controlling an amount of current of the third current path in correspondence to the peak level of the rectified voltage in the second mode.

15. The LED lighting apparatus of claim 14, wherein the second driver comprises a power compensating section which generates a power compensating signal in correspondence to the peak voltage and changes a reference voltage corresponding to the fourth LED light source depending on the power compensation signal, and wherein the second driver performs the power regulation of controlling an amount of current of the third current path by comparing the reference voltage which is changed and a sensing voltage corresponding to driving current of the third current path.

16. The LED lighting apparatus of claim 11, wherein the mode detection circuit comprises:
    a voltage sensing section configured to provide the peak voltage corresponding to the peak level of the rectified voltage; and
    a mode detecting section configured to provide the mode detection signal which has a different level in each mode depending on the peak voltage.

17. The LED lighting apparatus of claim 11, wherein the current control unit turns on a first bypass path which transfers the rectified voltage to the second light source group by bypassing the first light source group, in correspondence to the current control signal during an entire period of the first mode, and wherein the current control unit turns on a second bypass path which transfers the rectified voltage to the second light source group by bypassing the first light source group, during the first period of the second mode, and turns off the second bypass path during a period other than the first period of the second mode.

18. The LED lighting apparatus of claim 11, wherein the current control unit comprises:
    a comparison voltage providing section configured to provide, in correspondence to the current control signal, a comparison voltage which has a first control level in the first mode and a second control level lower than the first control level in the second mode;
    a comparator configured to compare a load voltage and the comparison voltage;
    a first switch configured to selectively transfer the rectified voltage by an output of the comparator;
    a second switch configured to be turned on in the first mode and be turned off in the second mode; and
    a load circuit including a first resistor and a second resistor which are connected in series between the first light source group and the second light source group, the first resistor being connected to an output terminal of the first switch and the first light source group and being configured in parallel with the second switch, and configured to provide the load voltage corresponding to an amount of current,
    wherein a first bypass path which includes the first switch, the second switch and the second resistor is provided in correspondence to the first mode, and a second bypass path which includes the first switch, the first resistor and the second resistor is provided in correspondence to the first period of the second mode.

19. The LED lighting apparatus of claim 11, wherein each of the first balancing circuit and the second balancing circuit comprises:
    a comparison voltage providing section configured to provide a comparison voltage which has a balancing level higher in the second mode than the first mode, in correspondence to the current control signal;
    a comparator configured to compare a load voltage and the comparison voltage;
    a switch configured to be controlled in switching by an output of the comparator; and
    a load circuit disposed between LED light sources in each light source group, connected to an output terminal of the switch, and configured to provide the load voltage corresponding to an amount of current,
    wherein a balancing path which includes the switch and the load circuit is provided depending on an operation of the switch according to change of the load voltage.

20. The LED lighting apparatus of claim 11, further comprising:
    a bleeder applied with the rectified voltage,
    wherein the first driver further provides, to the bleeder, a fourth current path which maintains a turn-on state during an extinguishment period of the first light source group, only in the first mode.

* * * * *